(12) United States Patent
Sugiyama et al.

(10) Patent No.: US 7,397,852 B2
(45) Date of Patent: Jul. 8, 2008

(54) IMAGE PROCESSING APPARATUS AND METHOD, AND IMAGE PROCESSING PROGRAM

(75) Inventors: Akira Sugiyama, Kanagawa (JP); Taro Takita, Tokyo (JP)

(73) Assignee: Sony Corporation, Tokyo (JP)

( * ) Notice: Subject to any disclaimer, the term of this patent is extended or adjusted under 35 U.S.C. 154(b) by 889 days.

(21) Appl. No.: 10/381,990

(22) PCT Filed: Aug. 2, 2002

(86) PCT No.: PCT/JP02/07898

§ 371 (c)(1),
(2), (4) Date: Apr. 1, 2003

(87) PCT Pub. No.: WO03/015423

PCT Pub. Date: Feb. 20, 2003

(65) Prior Publication Data

US 2004/0028128 A1    Feb. 12, 2004

(30) Foreign Application Priority Data

Aug. 2, 2001    (JP)    ............................. 2001-234792

(51) Int. Cl.
 *H04N 7/18*    (2006.01)
(52) U.S. Cl. ............................ 375/240.02; 375/240.03; 375/240.24
(58) Field of Classification Search ................ 375/240.01–240.29
See application file for complete search history.

(56) References Cited

U.S. PATENT DOCUMENTS

| | | | |
|---|---|---|---|
| 5,214,507 A * | 5/1993 | Aravind et al. ............ | 348/390.1 |
| 5,294,974 A * | 3/1994 | Naimpally et al. ........ | 348/395.1 |
| 6,084,982 A * | 7/2000 | Challapali et al. ........... | 382/166 |
| 6,275,614 B1 * | 8/2001 | Krishnamurthy et al. .... | 382/224 |
| 6,529,634 B1 * | 3/2003 | Thyagarajan et al. ........ | 382/239 |

FOREIGN PATENT DOCUMENTS

| | | |
|---|---|---|
| JP | 5-227441 | 9/1993 |
| JP | 7-107515 | 4/1995 |

(Continued)

*Primary Examiner*—Andy S Rao
(74) *Attorney, Agent, or Firm*—Frommer Lawrence & Haug LLP; William S. Frommer

(57) ABSTRACT

Picture data is compressed and encoded in consideration of visual characteristics of human beings against colors. A color of pixels is detected corresponding to color difference components Cb and Cr for each sub block into which a macro block is divided. Each sub block is composed of four pixels × four lines. The number of pixels from which a predetermined color is detected is counted for each sub block. When the count value is ⅔ or greater of the total number of pixels of each sub block, it is determined that the macro block which contains the sub block contains the predetermined color. An activity is obtained using a luminance component Y for the macro block. The activity is multiplied by a quantizer priority value corresponding to the predetermined color. As a result, the activity is corrected. Corresponding to the corrected activity, the quantizer scale value is changed to a smaller value. With the changed quantizer scale value, the macro block is quantized with a smaller quantizer step value. As a result, the picture quality of a macro block from which a predetermined color has been detected is suppressed from being deteriorated.

22 Claims, 19 Drawing Sheets

FOREIGN PATENT DOCUMENTS

| | | |
|---|---|---|
| JP | 7-154798 | 6/1995 |
| JP | 7-236160 | 9/1995 |
| JP | 8-181992 | 7/1996 |
| JP | 8-340554 | 12/1996 |
| JP | 10 126621 | 5/1998 |
| WO | WO 00/00932 | 1/2000 |

* cited by examiner

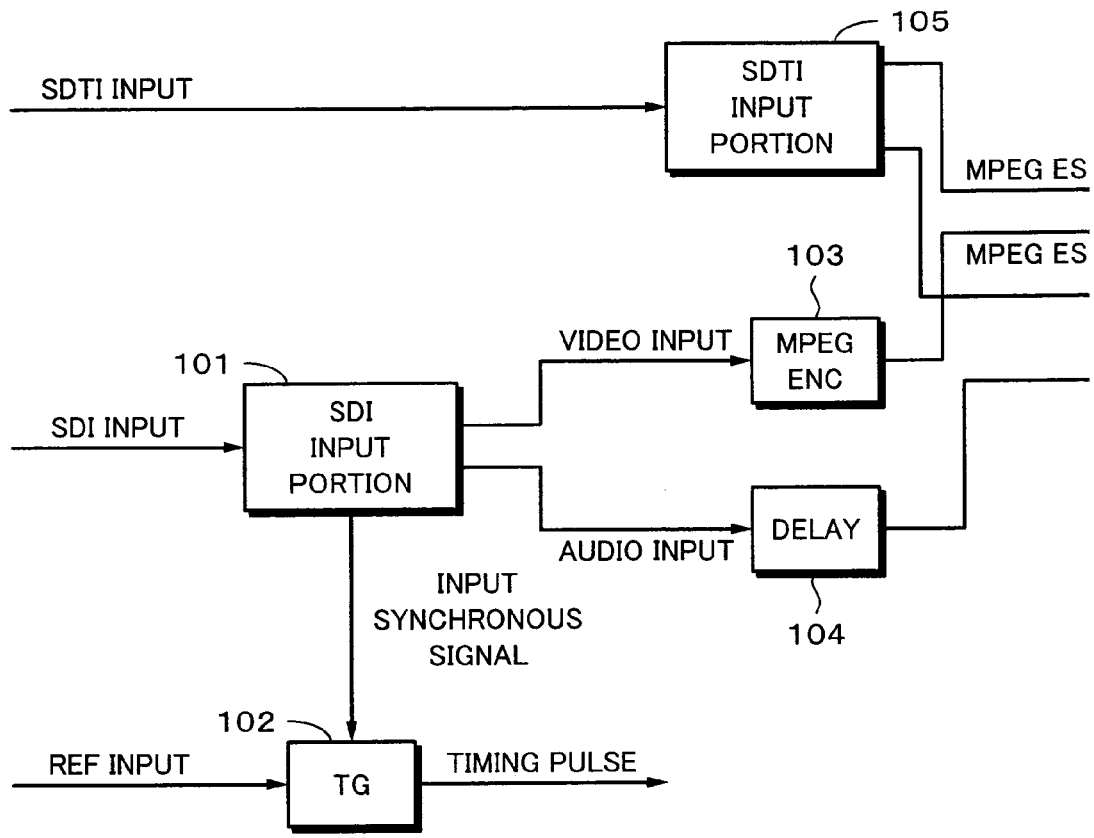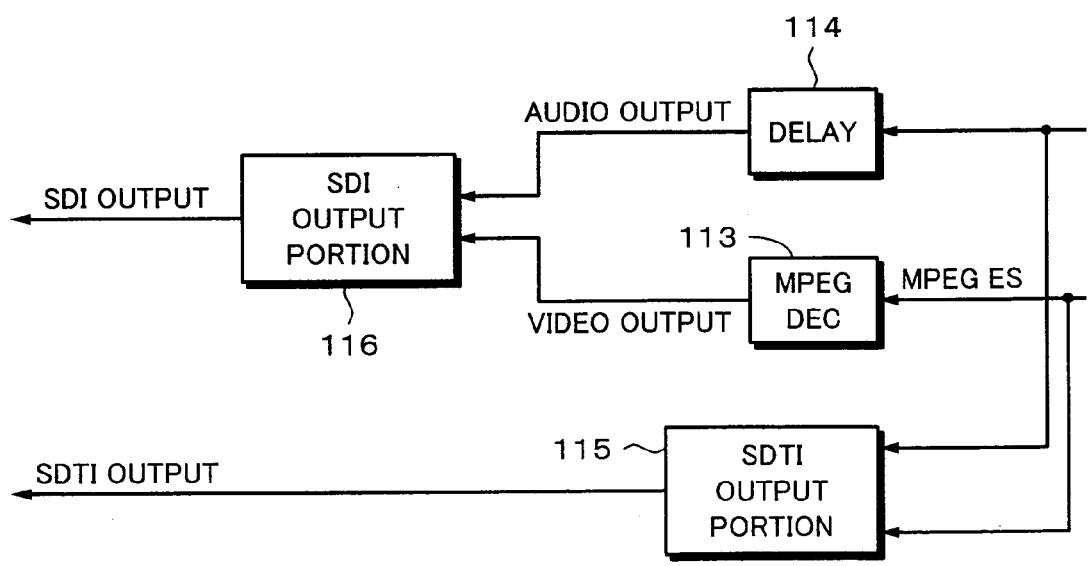
Fig. 1A
Fig. 1
| Fig. 1A | Fig. 1B |

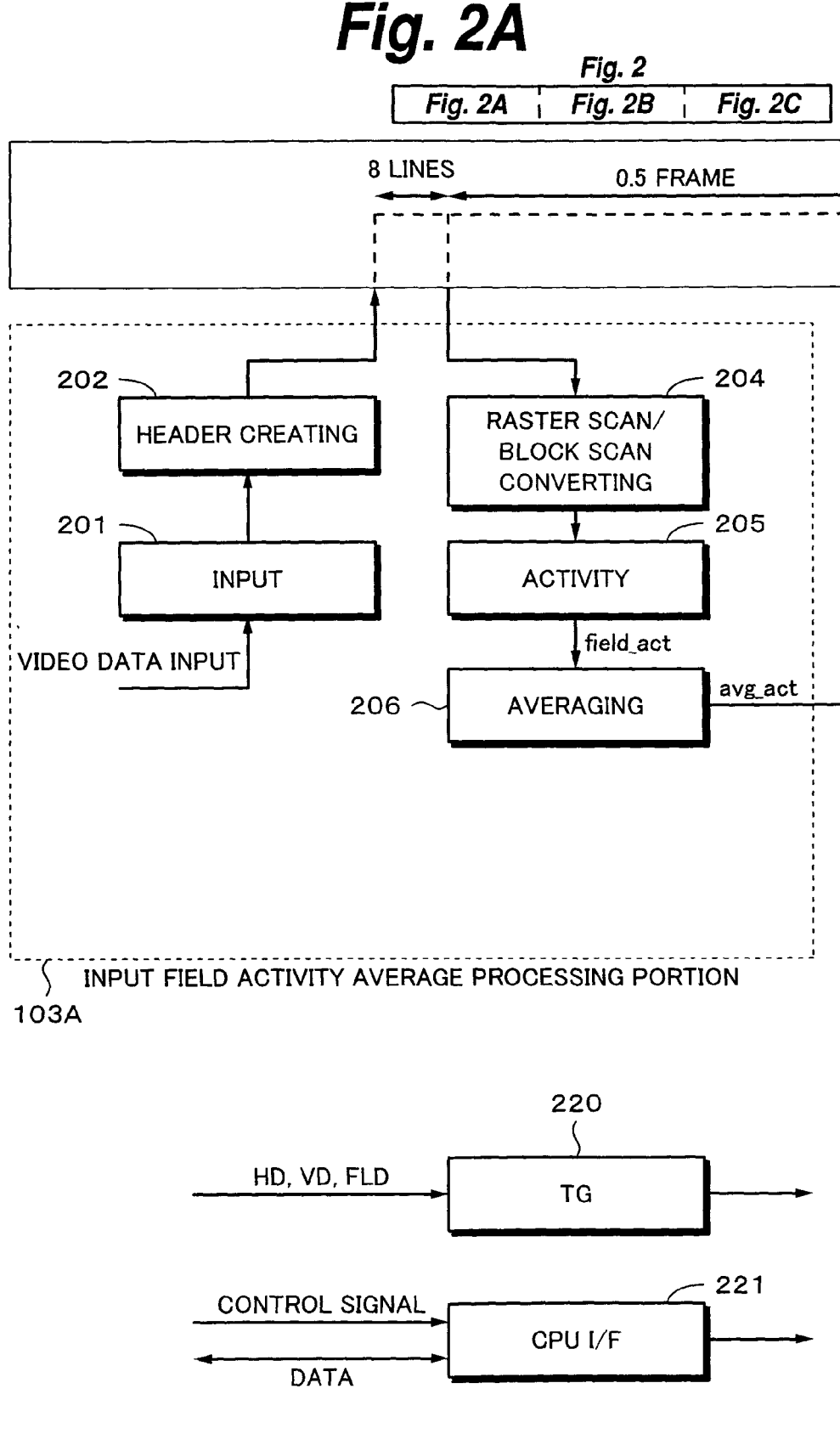

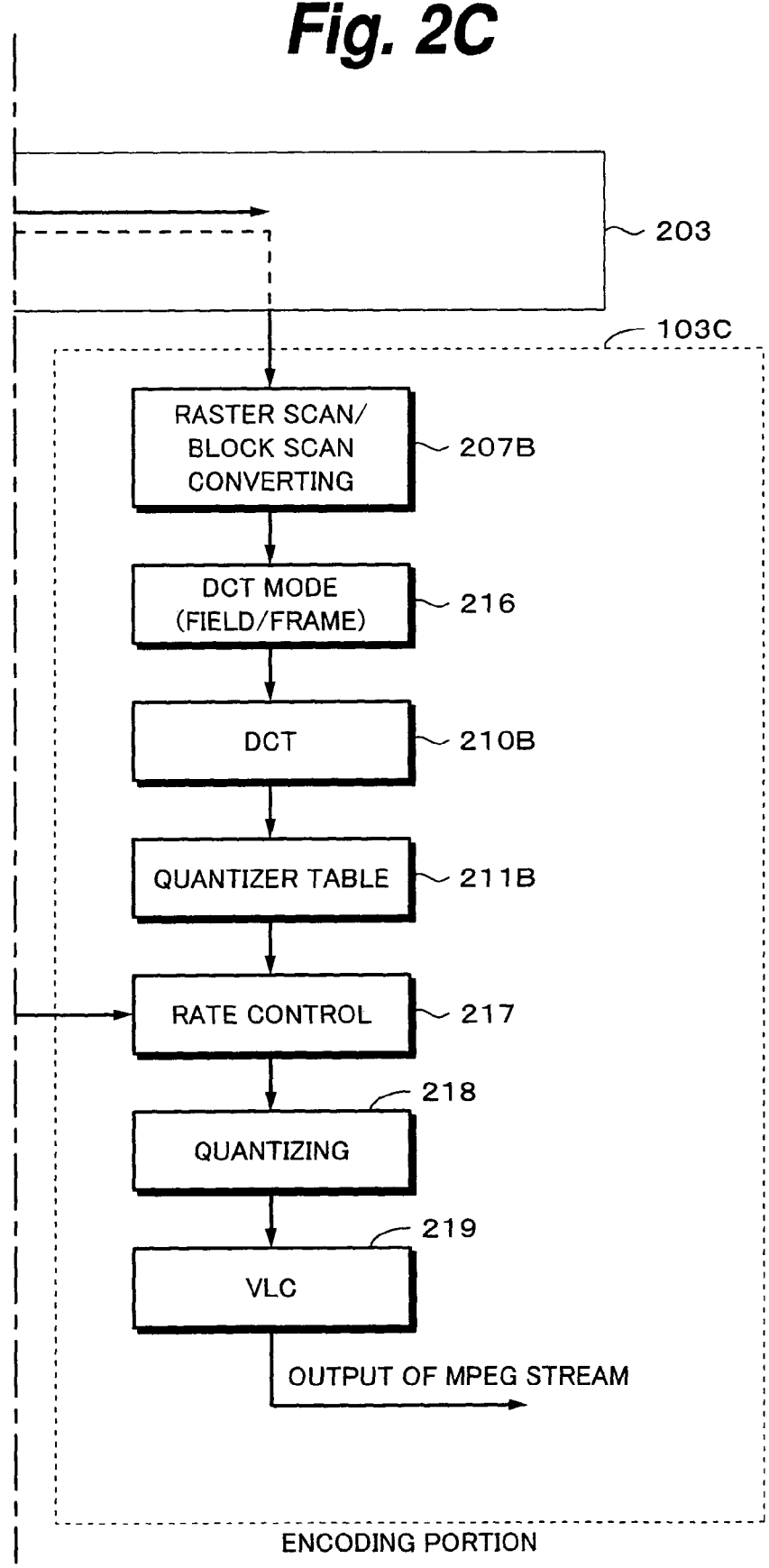

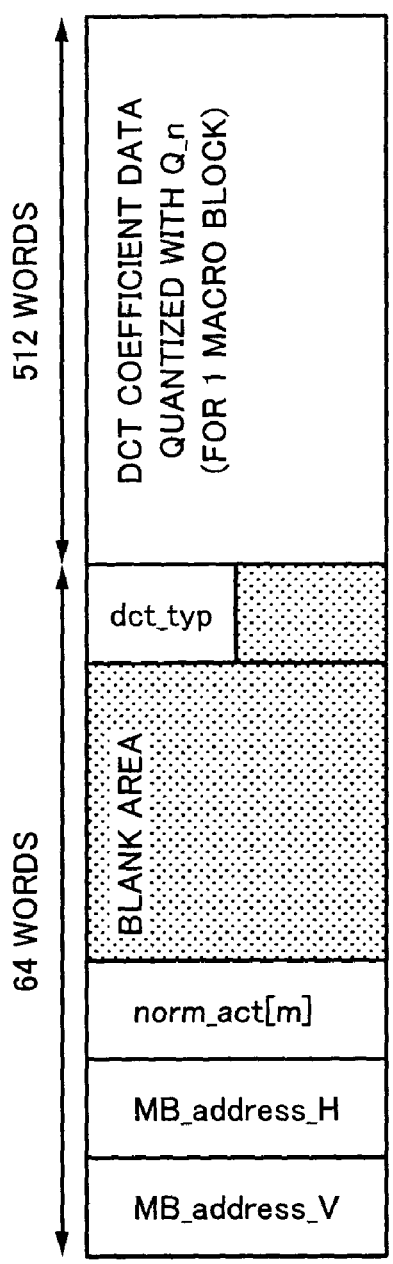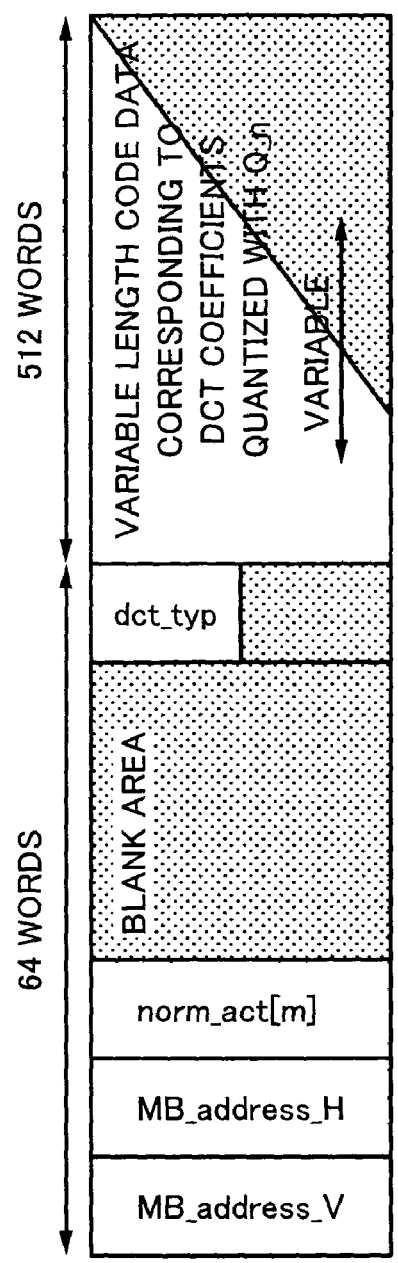
Fig. 5A
Fig. 5B

IMAGE PROCESSING APPARATUS AND METHOD, AND IMAGE PROCESSING PROGRAM

TECHNICAL FIELD

The present invention relates to a picture processing apparatus, a method thereof, and a picture processing program for compressing and encoding picture data in the unit of a block.

BACKGROUND ART

In a known picture data compressing and encoding system, picture data is quantized in the unit of a block composed of a predetermined number of pixels. Such a compressing and encoding system has been used in for example MPEG2 (Moving Pictures Experts Group 2). In the MPEG2, picture data is processed corresponding to DCT (Discrete Cosine Transform) in the unit of a block composed of a predetermined number of pixels. Obtained DCT coefficients are quantized. In such a manner, the picture data is compressed and encoded. In the MPE2, a quantizer scale value which represents a quantizer step is designated. With the designated quantizer scale value, DCT coefficients are compressed and encoded.

In the compressing and encoding process corresponding to the MPEG2, an index number referred to as an activity which represents the complexity and smoothness of a picture to be compressed is calculated and the picture quality is optimized corresponding to an adaptive quantizing process based on the activity.

In this method, when a picture is simple and smooth, if it is compressed, the deterioration of the picture quality is visually prominent. In this region (hereinafter referred to as a flat region), the picture is finely quantized with a quantizer scale value which is a fine quantizer step. In contrast, when a picture is complicated, the deterioration of the picture quality is not visually prominent. In this region, the picture is coarsely quantized with a quantizer scale value which is a coarse quantizer step. In this method, with a limited code amount, the picture quality is effectively optimized.

As was described above, when picture data is compressed, each picture region is divided into pixel blocks each of which has a predetermined size. Each block is quantized and processed corresponding to the DCT method. The MPEG2 standard prescribes a block of eight pixels×eight lines as the minimum process unit. Each block of eight pixels×eight lines is processed corresponding to the DCT method. DCT coefficients obtained corresponding to the DCT method are quantized in the unit of a macro block of 16 pixels×16 lines.

On the other hand, the MPEG2 standard does not clearly prescribe a unit in which an activity is calculated. However, in TM5 (Test Model 5) of the MPEG2, it has been proposed that an activity should be processed in the unit of a sub block of eight pixels and eight lines which is similar to a DCT block.

Next, an activity calculating method used in "Adaptive quantization considering visual characteristics" adopted in the MPEG2 TM5 will be described.

In the adaptive quantization, a quantizer scale value Qj is varied corresponding to an activity of each macro block so that a code amount generated in one frame is controlled corresponding to the state of the picture. As a result, the high picture quality is accomplished. For example, in a flat region of which the deterioration of the picture quality is visually prominent, each macro block is quantized with a quantizer scale value Qj which is a fine quantizing step. In a complicated picture region of which the deterioration of the picture quality is relatively non-prominent, each macro block is quantized with a quantizer scale value Qj which is a coarse quantizer step. To do that, a quantizer scale value Qj is varied corresponding to an activity.

An activity is obtained by successively calculating the following formulas (3), (2), and (1) for a j-th macro block using pixel values of a luminance signal of an original picture for a total of eight blocks of four blocks of a frame DCT encoding mode and four blocks of a field DCT encoding mode rather than a prediction error.

$$act_j = 1 + \min[sblk=1, 8](var\_sblk) \quad (1)$$

$$var\_sblk = \tfrac{1}{64}\Sigma[k=1, 64](Pk - Pavg)^2 \quad (2)$$

$$Pavg = \tfrac{1}{64}\Sigma[k=1, 64]P_k \quad (3)$$

where Pk represents a pixel value in a luminance signal block of the original picture. In the formula (3), pixel values of 64 pixels of a block composed of eight pixels×eight lines are summed and divided by 6. As a result, an average value Pavg of the pixel values is obtained. Next, in the formula (2), the difference between the average value Pavg and Pk is obtained. As a result, average difference values of the block composed of eight pixels×eight lines are calculated. In the formula (1), with the minimum value of the average difference values var_sblk, an activity $act_j$ of the macro block is obtained. This is because even if a part of the macro block contains a flat portion, it is necessary to finely quantize the macro block.

As visual characteristics of human beings against colors, the sensitivity of red is the highest. Thus, the deterioration of red can be easily detected. Moreover, in a studio photography or the like, blue used in a blue back of a chroma-key is a color whose deterioration should be suppressed from a view point of a picture process.

Thus, it has been desired to suppress a compression ratio for a picture region containing a color component whose deterioration should be suppressed in color components which compose a color picture to be compressed and encoded so that colors can be represented more precisely than before.

DISCLOSURE OF THE INVENTION

Thus, an object of the present invention is to provide a picture processing apparatus, a method thereof, and a picture processing program for suppressing a compression ratio of a region containing a particular color component so as to improve a visual effect in consideration of visual characteristics of human beings against colors.

To solve the forgoing problem, claim 1 of the present invention is a picture processing apparatus, comprising color detecting means for determining whether or not each block of picture data represents at least one predetermined color; quantizing means for quantizing the picture data with a quantizer step width which is set for each block; and quantizer step width changing means for setting a smaller quantizer step width of the quantizer means to a block which represents the predetermined color than a block which does not represents the predetermine color.

In addition, claim 8 of the present invention is a picture processing method, comprising the steps of determining whether or not each block of picture data represents at least one predetermined color; quantizing the picture data with a quantizer step width which is set for each block; and setting a smaller quantizer step width at the quantizer step to a block which represents the predetermined color than a block which does not represents the predetermine color.

In addition, claim 15 of the present invention is a picture processing program for causing a computer apparatus to execute a picture processing method, comprising the steps of determining whether or not each block of picture data represents at least one predetermined color; quantizing the picture data with a quantizer step width which is set for each block; and setting a smaller quantizer step width at the quantizer step to a block which represents the predetermined color than a block which does not represents the predetermine color.

As was described above, according to the present invention, it is determined whether or not each block of picture data represents at least one predetermined color. In addition, picture data is quantized with a quantizer step width which is set for each block. A smaller quantizer stop width is set to a block which represents a predetermined color than a block which does not represent the predetermined color. Thus, picture data can be quantized in consideration of visual characteristics of eyes of human beings against colors.

BRIEF DESCRIPTION OF DRAWINGS

FIGS. 1A and 1B are block diagrams showing an example of the structure of a digital VTR according to an embodiment of the present invention;

FIGS. 2A, 2B, and 2C are block diagrams showing an example of the structure of an MPEG encoder;

FIGS. 5A and 5B are schematic diagrams showing an example of the structure of a stream transferred in each portion of the MPEG encoder;

BEST MODES FOR CARRYING OUT THE INVENTION

Next, an embodiment of the present invention will be described. According to the present invention, pixels of a predetermined color are detected for each block of picture data. When the number of detected pixels is equal to or greater than a predetermined threshold value against the total number of pixels, it is determined that the predetermined color has been detected from the block. A smaller quantizer scale value is set to a picture region which contains the block than the other picture regions. With a smaller quantizer step width, the picture region is more finely quantized. Consequently, the picture quality of the picture region containing the predetermined color is suppressed from being deteriorated and the visual effect for the color is improved.

According to the embodiment of the present invention, the value of an activity, which represents the complexity of a picture, as was described in the section of "Related Art," is corrected corresponding to the detected color. As a result, the quantizer step width of the picture region is varied.

An embodiment which will be described in the following is a preferred embodiment of the present invention. Although various technically preferred limitations are made in the following embodiment, unless explicitly stated that they restrict the present invention, the scope of the present invention is not restricted by such limitations.

Figure 1B:
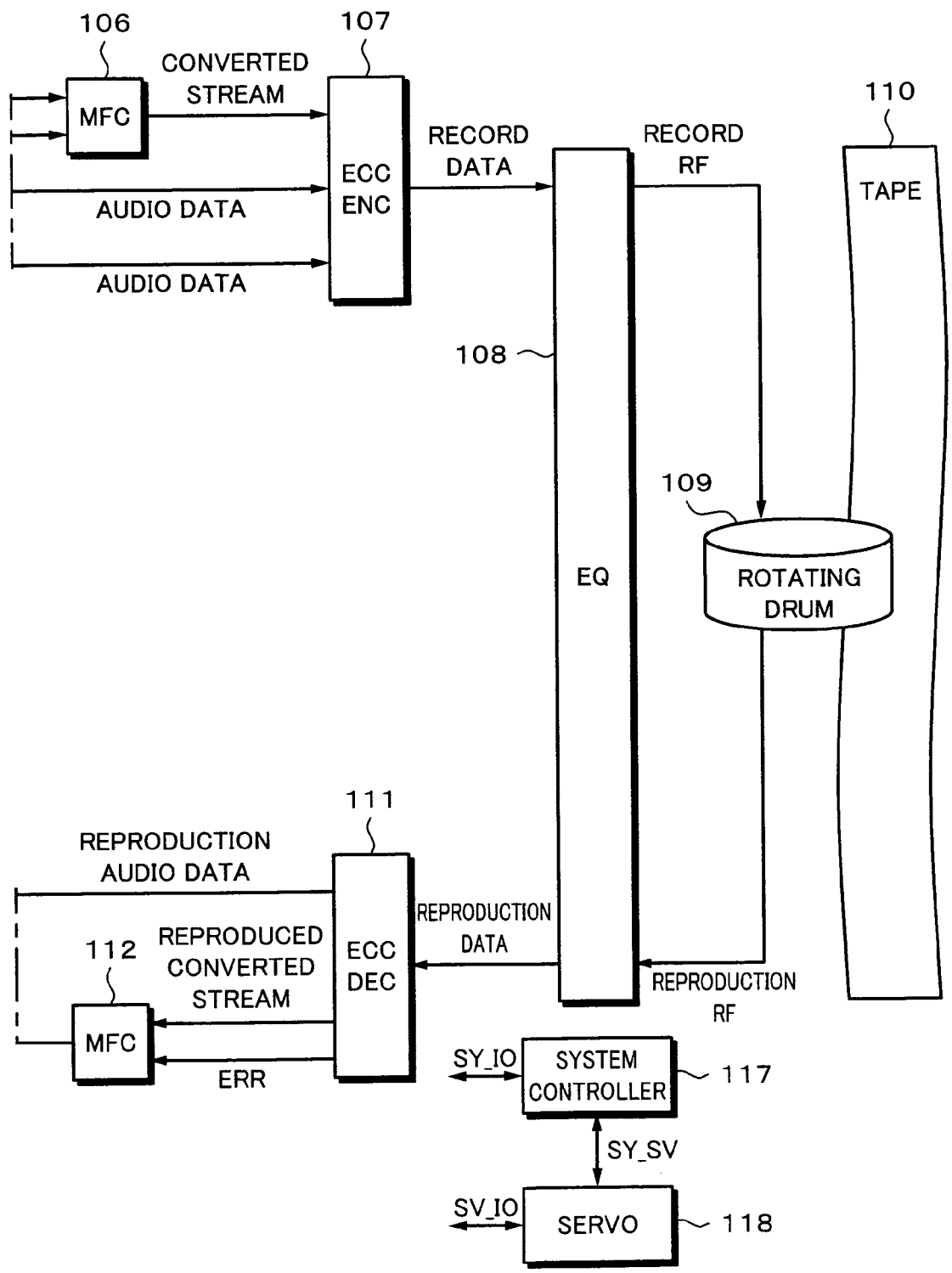

Next, an embodiment of the present invention will be described. FIGS. 1A and 1B show the structure of an example of a digital VTR according to the embodiment of the present invention. The digital VTR can directly record a digital video signal which has been compressed and encoded corresponding to the MPEG system to a record medium.

First of all, the structure, process, and operation of a recording system of the digital VTR will be described. Two types of serial-digital interface signals which are an SDI (Serial Data Interface) signal and an SDTI (Serial Data Transport Interface) signal and an external reference signal REF as a control signal are input from the outside to the recording system.

The SDI is an interface prescribed by SMPTE. The SDI transmits a (4:2:2) component video signal, a digital audio signal, and additional data. The SDTI is an interface which transmits an MPEG elementary stream which is a stream of which a digital video signal has been compressed and encoded corresponding to the MPEG system (hereinafter this MPEG elementary stream is referred to as MPEG ES). An ES is composed of 4:2:2 components. An ES is a steam composed of only I pictures and has the relation of 1 GOP=1 picture. In an SDTI-CP (Content Package) format, an MPEG ES is divided into access units. In addition, an MPEG ES is packed in packets in the unit of a frame. In the SDTI-CP, a sufficient transmission band (at 27 MHz or 36 MHz of a clock rate or at 270 Mbps or 360 Mbps of a stream bit rate) is used. In one frame period, an ES can be transmitted as a burst.

An SDI signal transmitted by the SDI is input to an SDI input portion 101. The SDI input portion 101 converts the input SDI signal as a serial signal into a parallel signal and outputs the parallel signal. In addition, the SDI input portion 101 extracts an input synchronous signal which is a input phase reference from the SDI signal and outputs the extracted input synchronous signal to a timing generator TG 102.

In addition, the SDI input portion 101 separates the converted parallel signal into a video signal and an audio signal. The separated video input signal and audio input signal are output to an MPEG encoder 103 and a delay circuit 104, respectively.

The timing generator TG 102 extracts a reference synchronous signal from the input external reference signal REF. The timing generator TG generates a timing signal necessary for the digital VTR in synchronization with a designated reference signal which is one of the reference synchronous signal and the input synchronous signal which is supplied from the SDI input portion 101 and supplies the generated timing signal as a timing pulse to each block.

The MPEG encoder 103 performs the DCT process for the input video input signal so as to transform it into coefficient data. Thereafter, the MPEG encoder 103 quantizes the coefficient data. Thereafter, the MPEG encoder 103 encodes the coefficient data with a variable length code (VLD). The variable length code encoded (VLC) data which is output from the MPEG encoder 103 is an elementary stream (ES) corresponding to the MPEG2. The output is supplied to one input terminal of a recording side multi-format converter (hereinafter referred to as recording side MFC).

According to the embodiment of the present invention, as was described above, the MPEG encoder 103 performs quantization by changing a quantizer scale value corresponding to a color component in consideration of visual characteristics of human beings against colors.

The delay circuit 104 functions as a delay line for matching the audio input signal as non-compressed data with a delay of a process of the MPEG encoder 103 for the video signal. The audio signal delayed by the delay circuit 104 for a predetermined amount is output to an ECC encoder 107. This is because in the digital VTR according to the embodiment, the audio signal is treated as a non-compressed signal.

The SDTI signal which is supplied from the outside and transmitted through the SDTI is input to an SDTI input portion 105. The SDTI input portion 105 detects the synchronization of the SDTI signal. The SDTI signal is temporarily stored in a buffer. An elementary stream is extracted from the SDTI signal.

The extracted elementary stream is supplied to the other input terminal of the recording side MFC 106.

The obtained synchronous signal is supplied to the forgoing timing generator TG 102 (not shown).

In addition, the SDTI input portion 105 extracts a digital audio signal from the input SDTI signal. The extracted digital audio signal is supplied to an ECC encoder 107.

In such a manner, the digital VTR according to the embodiment can directly input an MPEG ES independent from a base band video signal which is input from the SDI input portion 101.

The recording side MFC circuit 106 has a stream converter and a selector. The recording side MFC circuit 106 selects an MPEG ES supplied from the MPEG encoder 103 or an MPEG ES supplied from the SDTI input portion 105 and groups DCT coefficients of a plurality of DCT blocks which compose one macro block corresponding to each frequency component. The recording side MFC circuit 106 rearranges the DCT coefficients in the order of lower frequency components. Hereinafter, a stream of which coefficients of an MPEG ES have been rearranged is referred to as converted elementary stream. When an MPEG ES is rearranged, in a search reproducing operation, as many DC coefficients and low order AC coefficients as possible are obtained. As a result, they contribute to the improvement of the quality of a searched picture. The converted elementary stream is supplied to the ECC encoder 107.

A main memory (not shown) having a large storage capacity is connected to the ECC encoder 107.

The ECC encoder 107 has a packing and shuffling portion, an audio outer code encoder, a video outer code encoder, an inner code encoder, an audio shuffling portion, a video shuffling portion, and so forth as internal devices. In addition, the ECC encoder 107 has a circuit which assigns an ID to each sync block and a circuit which adds a synchronous signal. According to a first embodiment of the present invention, as an error correction code for a video signal and an audio signal, a product code is used. The product code is composed of an outer code and an inner code. A video signal or an audio signal is encoded with an outer code and an inner code in the vertical direction and horizontal direction, respectively, of a two-dimensional matrix thereof. As a result, a data symbol is dually encoded. As an outer code and an inner code, Reed-Solomon code can be used.

The converted elementary stream which is output from the MFC circuit 106 is supplied to the ECC encoder 107. In addition, audio signals which are output from the SDTI input portion 105 and the delay circuit 104 are supplied to the ECC encoder 107. The ECC encoder 107 performs a shuffling process and an error correction code encoding process for the supplied converted elementary stream and audio signals, adds an ID and a synchronous signal to each sync block, and outputs the resultant data as record data.

The record data which is output from the ECC encoder 107 is converted into a record RF signal by an equalizer EQ 108 which contains a record amplifier. The record RF signal is supplied to a rotating drum 109 on which a rotating head is disposed in a predetermined manner. In reality, a plurality of magnetic heads having different azimuths for forming adjacent tracks are disposed on the rotating drum 109.

When necessary, a scrambling process may be performed for record data. When data is recorded, a digital modulation may be performed for the data which is recorded. In addition, partial response class 4 and Viterbi code may be used. The equalizer 108 contains both a recording side structure and a reproducing side structure.

Next, the structure, process, and operation of the reproducing system of the digital VTR will be described. When data is reproduced from the magnetic tape 110, the data is reproduced as a reproduction signal by the rotating drum 109. The reproduction signal is supplied to the reproducing side structure of the equalizer 108 which contains a reproducing amplifier and so forth. The equalizer 108 equalizes the reproduction signal and shapes the waveform thereof. When necessary, the equalizer 108 performs a digital modulating operation and a Viterbi decoding operation. An output of the equalizer 108 is supplied to an ECC decoder 111.

The ECC decoder 111 performs an inverse process of the forgoing ECC encoder 107. The ECC decoder 111 contains a large capacity main memory, an inner code decoder, an audio deshuffling portion, a video deshuffling portion, and an outer code decoder. In addition, for video data, the ECC decoder 111 contains a deshuffling and depacking portion and a data interpolating portion. Likewise, for audio data, the ECC decoder 111 contains an audio AUX separating portion and a data interpolating portion.

The ECC decoder 111 detects the synchronization of the reproduction data, detects a synchronous signal added at the beginning of a sync block, and extracts the sync block. Each sync block of the reproduction data is error-corrected with an inner code. Thereafter, an ID interpolating process is performed for each sync block. The reproduction data for which the ID interpolating process has been performed is separated into video data and audio data. A deshuffling process is performed for each of the video data and the audio data. As a result, the sequence of data which was shuffled when the data was recorded is restored to the original sequence. The deshuffled data is error-corrected with an outer code.

When data has an error the ECC decoder 111 cannot correct due to its error correcting capability, the ECC decoder 111 sets an error flag to the data. With respect to error of video data, the ECC decoder 111 outputs a signal ERR which represents data which contains an error.

Reproduction audio data which has been error-corrected is supplied to an SDTI output portion 115. In addition, the reproduction audio data is supplied to a delay circuit 114. The delay circuit 114 delays the reproduction time for a predetermined amount. The delayed reproduction audio data is supplied to an SDI output portion 116. The delay circuit 114 is disposed to absorb the delay of the video data in the process of an MPEG decoder 113 which will be described later.

On the other hand, video data which has been error-corrected is supplied as a reproduced converted elementary stream to a reproducing side MFC circuit 112. The forgoing signal ERR is also supplied to the reproducing side MFC 112. The reproducing side MFC 112 performs the inverse process of the forgoing recording side MFC 106. The reproducing side MFC 112 contains a stream converter. The stream converter performs the inverse process of the recording side stream converter. In other words, the stream converter rearranges DCT coefficients for each frequency component to those for each DCT block. Thus, the reproduction signal is converted into an elementary stream corresponding to the MPEG2. At that point, when the signal ERR is supplied from the ECC decoder 111, the corresponding data is substituted for a signal fully corresponding to the MPEG2. The resultant signal is output.

The MPEG ES which is output from the reproducing side MFC circuit 112 is supplied to the MPEG decoder 113 and the SDTI output portion 115. The MPEG decoder 113 decodes (restores) the supplied MPEG ES to the original non-compressed video signal. In other words, the MPEG decoder 113 performs an inversely quantizing process and an inverse DCT process for the supplied MPEG ES. The decoded video signal is supplied to the SDI output portion 116.

As was described above, audio data which has been separated from video data by the ECC decoder 111 is supplied to the SDI output portion 116 through the delay 114. The SDI output portion 116 maps the supplied video data and audio data to an SDI format and converts them into an SDI signal having a data structure of the SDI format. The SDI signal is output to the outside.

On the other hand, as was described above, audio data which had been separated from video data by the ECC decoder 111 has been supplied to the SDTI output portion 115. The SDTI output portion 115 maps video data and audio data as an elementary stream to an SDTI format and converts them into an SDTI signal having a data structure of an SDTI format. The SDTI signal is output to the outside.

A system controller 117 (abbreviated as syscon 117 in FIGS. 1A and 1B) is composed of for example a microcomputer. The system controller 117 communicates with each block using a signal SY_IO and controls the overall operation of the digital VTR. When switches and so forth disposed on an operation panel (not shown) are operated, corresponding control signals are supplied to the system controller 117. Corresponding to the control signals, the system controller 117 controls operations such as a recording operation, a recording operation, and so forth of the digital VTR.

A servo 118 communicates with the syscon, system controller, 117 using the signal SY_SV and controls the traveling of the magnetic tape 110 and the driving of the rotating drum 109 using the signal SV_IO.

Figure 2B:
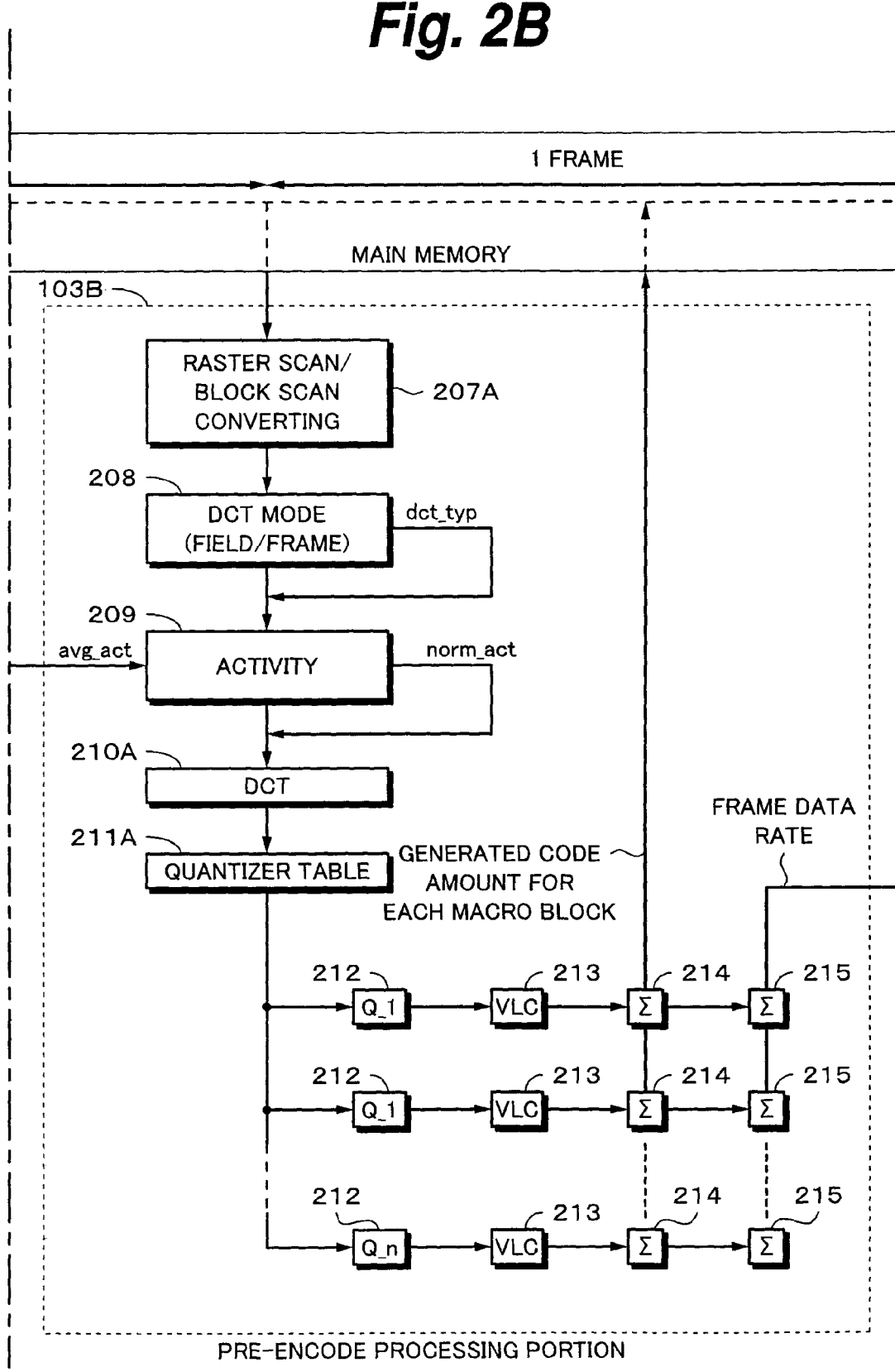

FIGS. 2A, 2B, and 2C show the structure of an example of the forgoing MPEG encoder 103. Examples of the structure of a stream transferred in each portion shown in FIG. 2A, FIG. 2B, and FIG. 2C are shown in FIG. 3A, FIG. 3B, FIG. 3C, FIG. 4A, FIG. 4B, FIG. 4C, FIG. 5A, FIG. 5B, FIG. 6A, FIG. 6B, FIG. 7A, FIG. 7B, FIG. 7C, FIG. 8A, FIG. 8B, FIG. 8C, and FIG. 9.

The MPEG encoder 103 is composed of an input field activity average processing portion 103A, a pre-encode processing portion 103B, and an encoding portion 103C. The input field activity average processing portion 103A obtains an average value of activities of input video data and supplies the obtained average value to the pre-encode processing portion 103B. With the average value of the activities, the pre-encode processing portion 103B estimates a generated code amount of the input video data which is quantized. Corresponding to the estimated result, while the encoding portion 103C is controlling the code amount, the encoding portion 103C actually quantizes the input video data, encodes the quantized video data with a variable length code, and outputs the resultant data as an MPEG ES.

Corresponding to a horizontal synchronous signal HD, a vertical synchronous signal VD, and a field synchronous signal FLD supplied from the timing generator TG 102 shown in FIGS. 1A and 1B, a timing generator TG 220 generates a timing signal required for the MPEG encoder 103 and outputs the generated timing signal thereto. A CPU I/F block 221 is an interface with the system controller 117 shown in FIGS. 1A and 1B. The operation of the MPEG encoder 103 is controlled with a control signal and data exchanged through the CPU I/F block 221.

First of all, a process performed by the input field activity average processing portion 103A will be described. Video data which is output from the SDI input portion 101 and then input to the MPEG encoder 103 is supplied to an input portion 201. The video signal is converted into an interface so that it is suitably stored in a main memory 203. In addition, a parity check is performed for the video data. The video data is output from the input portion 201 to a header creating portion 202. Using a vertical blanking region or the like, headers such as sequence_header, quantizer_matrix, and gop_header of the MPEG are created. The created headers are stored in the main memory 203. These headers are mainly designated by the CPU I/F block 221. In other than the vertical blanking region, the header creating portion 202 stores video data supplied from the input portion 201 to the main memory 203.

The main memory 203 is a frame memory for a picture. The main memory 203 rearranges video data and absorbs a system delay. Video data is rearranged by for example an address controller (not shown) in such a manner that the address controller controls a read address of the main memory 203. In FIGS. 2A, 2B, and 2C, 8 lines, 0.5 frame, and 1 frame described in the block of the main memory 203 represent read timings of the main memory 203 as delay values. They are properly controlled corresponding to a command issued by the timing generator TG 220.

A raster scan/block scan converting portion 204 extracts MPEG macro blocks from each line of the video data stored in the main memory 203 and supplies the extracted MPEG macro blocks to an activity portion 205 disposed downstream thereof. According to the embodiment of the present invention, since activities are calculated with only the first field, macro blocks which are output from the raster scan/block scan converting portion 204 are composed of video data of the first field.

Figure 3A:
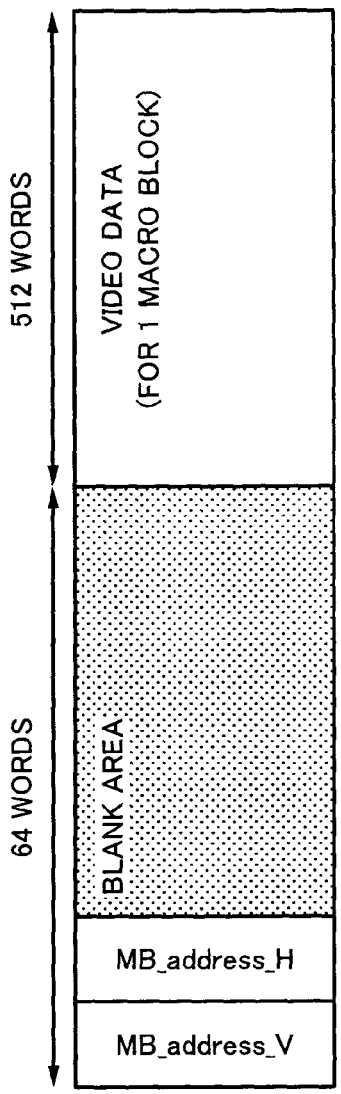
FIGS. 3A, 3B, and 3C are schematic diagrams showing an example of the structure of a stream transferred in each portion of the MPEG encoder.

As with an example shown in FIG. 3A, a stream which is output as output data from the raster scan/block scan converting portion 204 contains vertical address information of the current macro block, horizontal address information thereof, a blank area having a predetermined size, and video data for the current macro block in the order.

The stream has a data length of 576 words each of which is composed of eight bits. The last 512 words (referred to as data portion) is assigned as an area for storing video data for one macro block. The first 64 words (referred to as header portion) contains the forgoing address information of the current macro block and a blank area for data and flags embedded by each portion disposed downstream of the raster scan/block scan converting portion 204.

A macro block corresponding to the MPEG is a matrix of 16 pixels×16 lines. On the other hand, the input field activity average processing portion 103A performs a process for obtaining activities of only the first field. Thus, when up to eight lines of the first field are stored in the main memory 203, the process can be started. In reality, the process is started with a command issued by the timing generator TG 220.

The activity portion 205 calculates an activity of each macro block. The MPEG encoder 103 calculates activities of only the first field. The calculated result is output as a field activity signal field_act. The signal field_act is supplied to an averaging portion 206. The averaging portion 206 cumulates activities of one field and obtains an average value avg_act. The average value avg_act is supplied to an activity portion 209 of the pre-encode processing portion 103B which will be described later. The activity portion 209 performs an activity normalizing process for each macro block using the average value avg_act of the first field.

Thus, after the activity average value avg_act of the first field has been obtained, with the average value, a pre-encoding process can be performed while the quantizing process is adaptively performed.

Next, the pre-encode processing portion 103B will be described. A raster scan/block scan converting portion 207A basically performs the same process as the forgoing raster scan/block scan converting portion 204. However, since the raster scan/block scan converting portion 207A performs a pre-encoding process for estimating a code amount, the raster scan/block scan converting portion 207A requires video data of both the first field and the second field. Thus, when up to eight lines of the second field are stored in the main memory 203, the raster scan/block scan converting portion 207A can structure an MPEG macro block having a size of 16 pixels×16 lines. At that point, the process can be started. In reality, the process is started with a command issued by the timing generator TG 220.

Video data which is output from the raster scan/block scan converting portion 207A is supplied to a DCT mode portion 208. The DCT mode portion 208 selects a field DCT encoding mode or a frame DCT encoding mode to be performed.

Figure 3B:
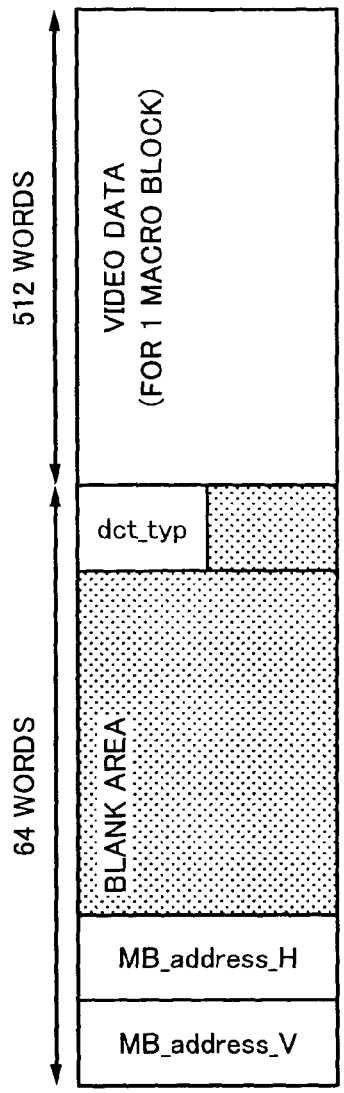

In this case, the encoding process is not actually performed. Instead, the sum of absolute values of difference values of pixels which are adjacent in the vertical direction is calculated in both the field DCT encoding mode and the frame DCT encoding mode. The sum obtained in the former is compared with the sum obtained in the latter. The encoding mode in which the smaller value is obtained is selected. The selected result is temporarily inserted as DCT mode type data dct_typ which is a flag in the stream. The flag is supplied to the later stages. As shown in FIG. 3B, the DCT mode type data dct_type is stored on the end side of the blank area of the header portion.

The video data which is output from the DCT mode portion 208 is supplied to a sub block forming portion (not shown). The sub block forming portion divides a macro block into sub blocks corresponding to the encoding mode decided by the DCT mode portion 208. The video data which has been divided into sub blocks is supplied to the activity portion 209.

Figure 3C:
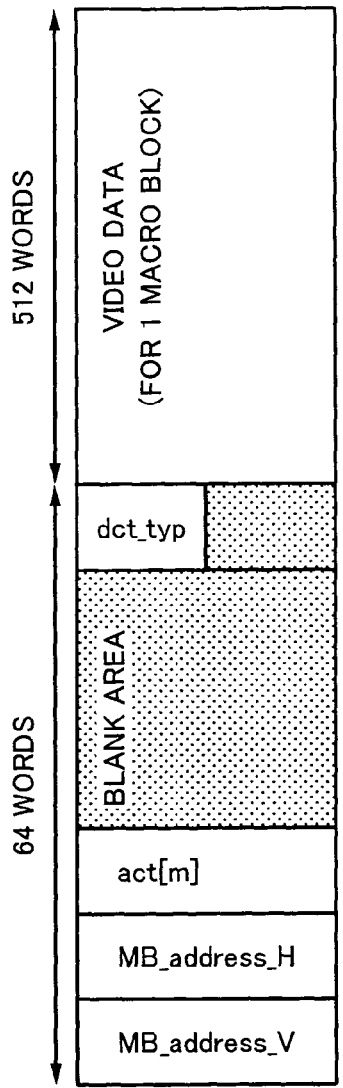

The activity portion 209 basically performs the same process as the forgoing activity portion 205. However, since the activity portion 209 performs a pre-encoding process as was described above, using data of both the first field and the second field, the activity portion 209 calculates an activity of each macro block. The activity portion 209 obtains an activity act. As shown in FIG. 3C, the activity act is placed after the macro block address of the header portion. Next, with the activity act and the field activity average value avg_act obtained by the averaging portion 206, the activity portion 209 obtains a normalized activity Nact.

Figure 4A:
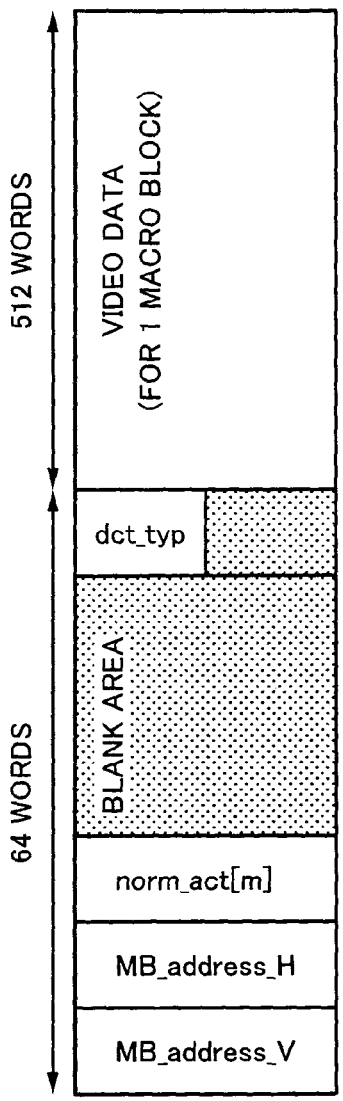
FIGS. 4A, 4B, and 4C are schematic diagrams showing an example of a stream transferred in each portion of the MPEG encoder.

As shown in FIG. 4A, the normalized activity Nact is temporarily inserted as normalized activity data norm_act which is a flag into the header portion of the stream. The flag is supplied to the downstream stages. In the stream, the forgoing activity act is overwritten with the normalized activity data norm_act.

On the other hand, the activity portion 209 detects color components of pixels for each sub block and counts the number of pixels in a range of which the detected color components are determined as a predetermined color. When the counted result exceeds a predetermined threshold value, for example at least ½ of the total number of pixels which compose a sub block, it is determined that the predetermined color has been detected in a macro block which contains the sub block. The normalized activity data norm_act of the macro block is corrected to a smaller value.

Figure 4B:
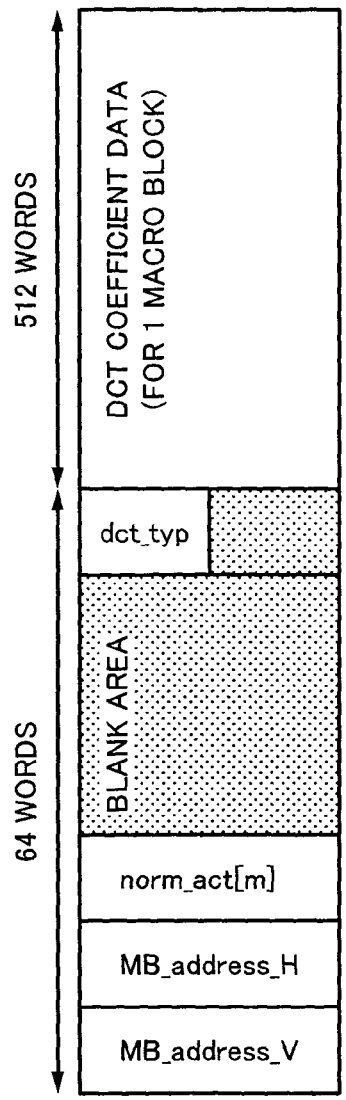

An output of the activity portion 209 is supplied to a DCT portion 210A. The DCT portion 210A divides the supplied macro block into DCT blocks each of which is composed of eight pixels×eight lines. The DCT portion 210A performs a two-dimensional DCT for each DCT block and generates DCT coefficients. As shown in FIG. 4B, the DCT coefficients are placed in the data portion of the stream and supplied to a quantizer table portion 211A.

Figure 4C:
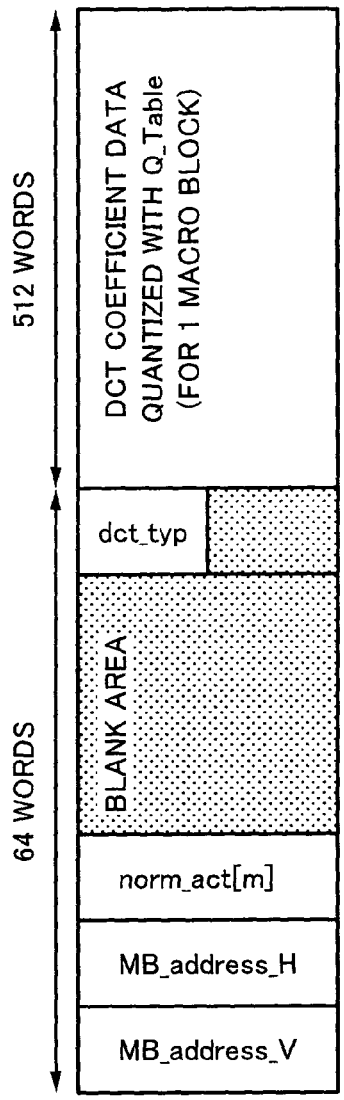

The quantizer table portion 211A quantizes DCT coefficients converted by the DCT portion 210A with a quantizer matrix (quantizer_matrix). As shown in FIG. 4C, DCT coefficients quantized by the quantizer table portion 211A are placed in the data portion of the stream and then output. An output of the quantizer table portion 211A is supplied to a multi-staged quantizing portion composed of a plurality of quantizing blocks 212, 212, . . . , a plurality of VLC portions 213, 213, . . . , a plurality of cumulating portions Σ 214, 214, . . . , and a plurality of cumulating portions Σ 215, 215, . . . DCT coefficients quantized by the quantizer table portion 211A are quantized by the multi-staged quantizing portion.

The quantizing blocks 211, 211, . . . quantize DCT coefficients with different quantizer scale (quantizer_scale) values Q. The quantizer scale values Q have been prescribed in for example the standard of the MPEG2. Corresponding to the standard, each of the quantizing blocks 212, 212, . . . is composed of n=31 quantizers. DCT coefficients are quantized with quantizer scales Qn assigned to the respective quantizing blocks 212, 212, . . . in a total of 31 steps. In the following description, the quantizer scale values of the Q_n portions 212, 212, . . . are denoted by quantizer scale values Qn.

The quantizing blocks 212, 212, . . . quantize DCT coefficients with respective quantizer scale values Qn. The quantized results of the quantizing blocks 212, 212, . . . are divided as integer parts and fractional parts and then output. As shown in FIG. 5A, the integer parts are placed as DCT coefficients for quantizer scale values Qn in the data portion of the stream and supplied to the VLC portions 213, 213, . . . . The VLC portions 213, 213, . . . perform a scanning operation such as a zigzag scanning operation for DCT coefficients for the respective quantizer scales Qn, references a VLC table corresponding to the two-dimensional Huffman code, and encodes the resultant DCT coefficients with a variable length code.

As shown in FIG. 5B, data which has been encoded with a variable length code by the VLC portions 213, 213, . . . is placed in the data portion of the stream and then output. Outputs of the VLC portions 213, 213, . . . are supplied to the corresponding cumulating portions Σ 214, 214, . . . , respectively.

Figure 6A:
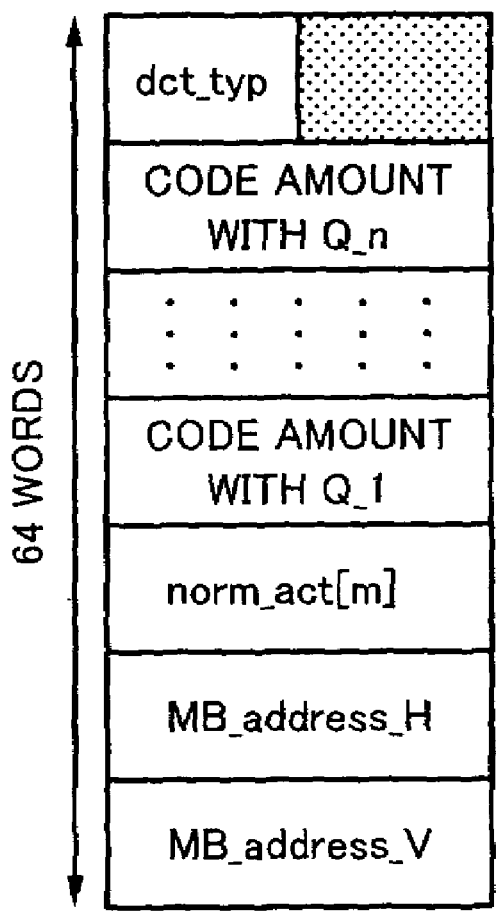
FIGS. 6A and 6B are schematic diagrams showing an example of the structure of a stream transferred in each portion of the MPEG encoder.

The cumulating portions Σ 214, 214, . . . each cumulate a generated code amount of each macro block. When 31 types of quantizers are used, 31 types of generated code amounts are obtained for each macro block. As shown in FIG. 6A, the generated code amounts cumulated by the cumulating portions Σ 214, 214, . . . are placed in the header portion of the stream. In other words, the generated code amounts quantized by the quantizing blocks 212, 212, . . . for each macro block are placed in the header portion of the stream. The data portion of the stream is deleted. The stream in which the generated code amounts for each macro block have been embedded is supplied to the main memory 203 and then the encoding portion 103C which will be described later.

With the generated code amounts for each macro block which are output from the cumulating portions Σ 214, 214, . . . , an adaptive quantizing process is performed. In other words, with the normalized activity data norm_act in consideration of visual characteristics against colors obtained by the forgoing activity portion 209, mqaunt as a quantizer scale in consideration of visual characteristics is obtained.

$$\text{mqaunt} = Q\_n \times \text{norm\_act} \quad (4)$$

The cumulating portions Σ 215, 215, . . . each select a code amount corresponding to a generated code amount for each macro block quantized with quantizer_scale (=mquant) in consideration of visual characteristics from generated code amounts for each macro block obtained by the cumulating portions Σ 214, 214, . . . and cumulates the code amounts for one frame.

Figure 6B:
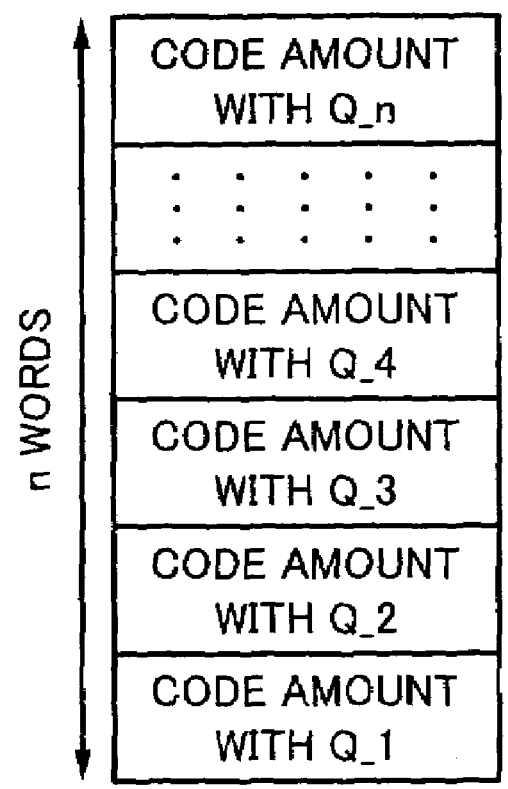

The values cumulated for one frame with each quantizer scale value Qn by the cumulating portions Σ 215, 215, . . . are generated code amounts (frame data rates) of the frame. They are a stream of n words as shown in FIG. 6B. The stream in which the frame data rates are embedded is supplied to a rate controlling portion 217 which will be described later. When 31 types of quantizers are used, 31 types of generated code amounts are obtained for each frame.

Next, a method for obtaining a generated code amount will be described in detail. For example, "a generated code amount of a frame by the cumulating portion Σ 215 corresponding to a Q_4 portion 212" is obtained as follows.

For example, when norm_act[1]=1.3 norm_act[2]=1.5 norm_act[3]=0.8 norm_act[4]=1.0

. . .

mqaunt[1]=4×1.3=5.2

: The generated code amount by the quantizing block 212 whose quantizer scale value Qn=5 is obtained from the header portion of the stream shown in FIG. 6A.

mqaunt[2]=4×1.5=6.0

: The generated code amount by the quantizing block 212 whose quantizer scale value Qn=6 is obtained from the header portion of the stream shown in FIG. 6A.

mqaunt[3]=4×0.8=3.2

: The generated code amount by the quantizing block 212 whose quantizer scale value Qn=3 is obtained from the header portion of the stream shown in FIG. 6A.

mqaunt[4]=4×1.0=4.0

: The generated code amount by the quantizing block 212 whose quantizer scale value Qn=4 is obtained from the header portion of the stream shown in FIG. 6A.

. . .

The generated code amounts for one frame are cumulated. This operation is performed by the cumulating portions Σ 215, 215, . . . corresponding to the Q_1 portion 212 to Q_n portion 212. As a result, generated code amounts for one frame are obtained.

Next, the encode processing portion 103C will be described. The encode processing portion 103C performs a final encoding process. As was described above, the pre-encode processing portion 103B estimates generated code amounts for one frame in various encoding operations. The encode processing portion 103C performs an encoding process corresponding to the estimated generated code amounts for one frame so that the generated code amount does not exceed a designated target code amount and outputs the encoded data as an MPEG ES.

Although data used by the encode processing portion 103C has been stored in the main memory 203, as was described above, when generated code amounts for one frame have been estimated in various encoding operations of the pre-encode processing portion 103B, the encode processing portion 103C can start the encoding process. As was described above, the process of each portion of the encode processing portion 103C is properly started corresponding to a command issued by the timing generator TG 220.

Figure 7A:
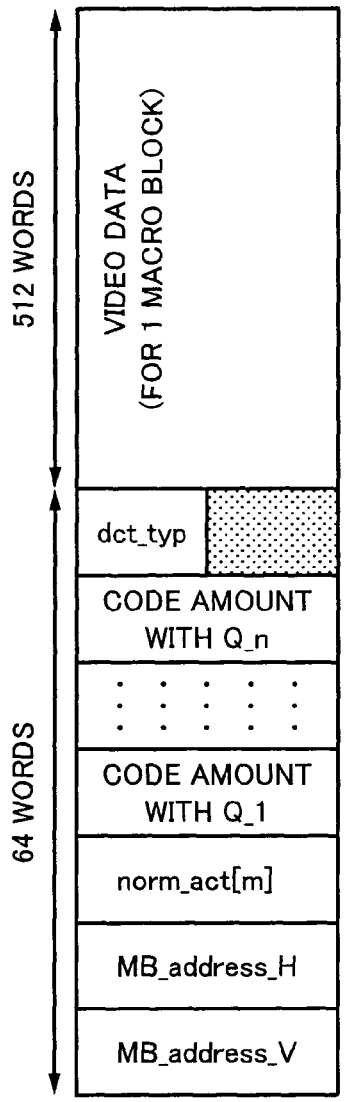
FIGS. 7A, 7B, and 7C are schematic diagrams showing an example of the structure of a stream transferred in each portion of the MPEG encoder.

A raster scan/block scan converting portion 207B processes video data which is read from the main memory 203 in the same manner as the raster scan/block scan converting portion 207A and extracts a macro block of 16 pixels×16 lines from the video data. As shown in FIG. 7A, the extracted macro block is placed in a data portion corresponding to the header portion shown in FIG. 6A and then supplied to a DCT mode portion 216.

Figure 7B:
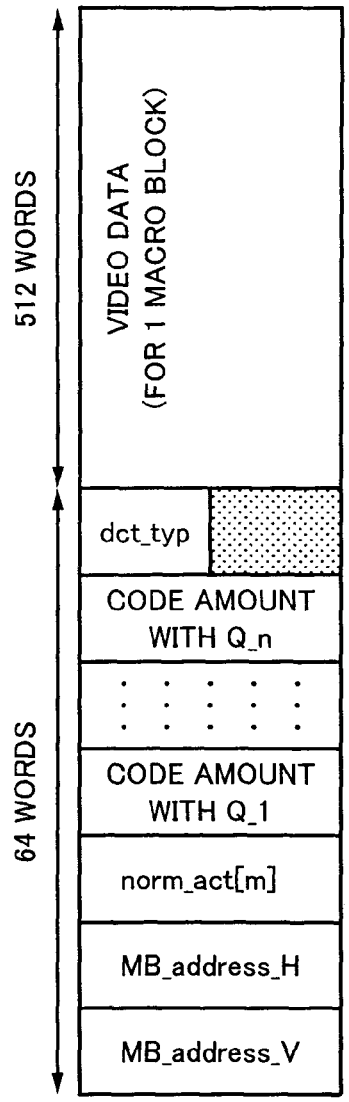

As with the forgoing DCT mode portion 208, the DCT mode portion 216 selects a field DCT encoding mode or a frame DCT encoding mode with which the encoding process is performed. At that point, the DCT mode portion 208 has selected an encoding mode. The selected result has been temporarily inserted as DCT type data dct_typ into a stream (see FIG. 7A). The DCT mode portion 216 detects the DCT type data dct_typ from the stream and switches the encoding mode between the field encoding mode and the frame encoding mode corresponding to the detected DCT type data dct_typ. An output of the DCT mode portion 216 is shown in FIG. 7B.

Figure 7C:
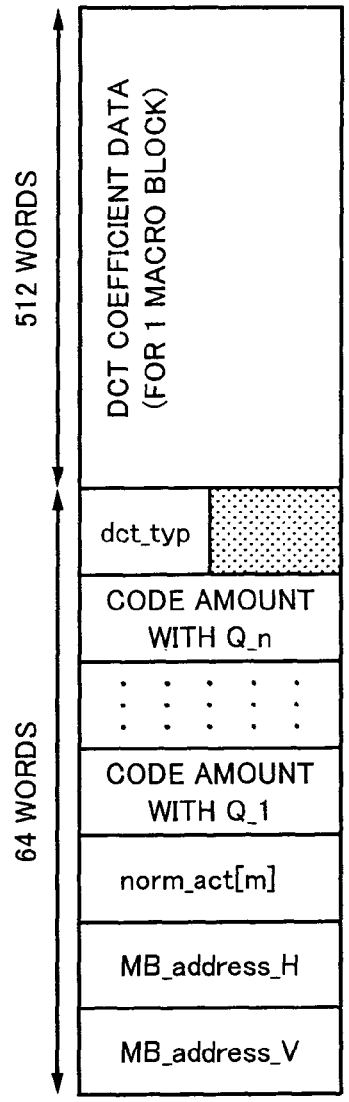

A macro block which is output from the DCT mode portion 216 is supplied to a DCT portion 210B. As with the forgoing DCT portion 210A, the DCT portion 210B performs a two-dimensional DCT process for each DCT block composed of eight pixels×eight lines. The resultant DCT coefficients are placed in the data portion of the stream as shown in FIG. 7C and then output from the DCT portion 210B.

Figure 8A:
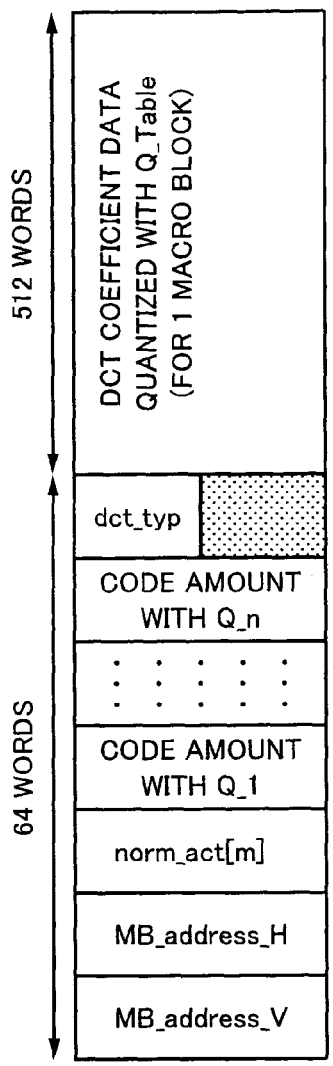
FIGS. 8A, 8B, and 8C are schematic diagrams showing an example of the structure of a stream transferred in each portion of the MPEG encoder.

A quantizer table portion 211B can be structured in the same manner as the quantizer table portion 211A. DCT coefficients generated by the DCT portion 210B are quantized with a quantizer matrix. The DCT coefficients quantized with the quantizer table portion 211B are placed in the data portion of the stream as shown in FIG. 8A and then supplied to the rate controlling portion 217.

Figure 8B:
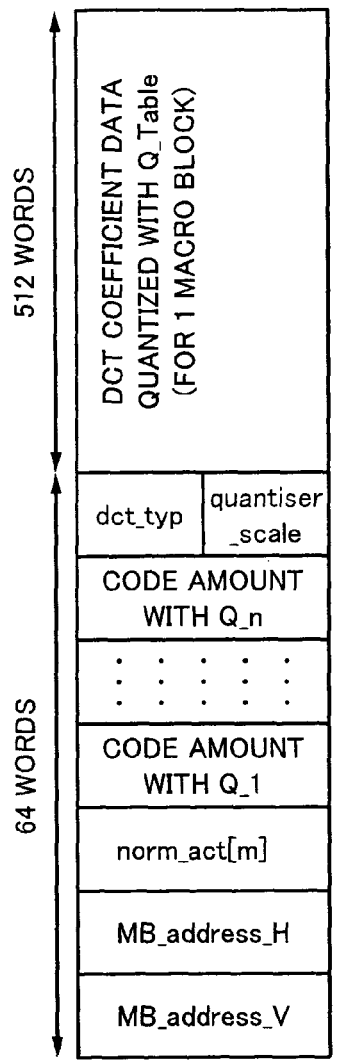

The rate controlling portion 217 selects a frame data rate from those for quantizer scale values Qn obtained by the cumulating portions Σ 215, 215, . . . of the pre-encode processing portion 103B so that the frame data rate does not exceed the maximum generated code amount per frame designated by the system controller 117 and is the closest thereto and obtains the quantizer scale value Q corresponding to the selected frame data rate. As shown in FIG. 8B, the quantizer scale value Q for each macro block is placed as qauntiser-scale on the rear end side of the header portion of the stream.

The remaining code amount is obtained by the rate controlling portion 217 with the maximum generated code amount (target code amount) per frame designated by the system controller 117 and supplied through the CPU I/F block 221 and the frame data rates for the quantizer scale values Qn supplied from the cumulating portions Σ 215, 215, . . . .

In addition, the quantizer scale (mquant) value for each macro block can be decreased by one size in the range that it does not exceed the difference between the maximum generated code amount per frame designated by the system controller 117 and supplied through the CPU I/F block 221 and the generated code amount per frame of the frame data rate selected by the rate controlling portion 217. Thus, the maximum generated code amount per frame designated by the system controller 117 and supplied through the CPU I/F block 221 can be nearly accomplished. As a result, a high picture quality can be accomplished.

The quantizing portion 218 extracts a quantizer scale (quantiases_scale) value designated in the forgoing manner by the rate controlling portion 217 from the stream and quantizes DCT coefficients quantized by the quantizer table portion 211B corresponding to the extracted quantizer scale value. At that point, the quantizer scale value supplied from the rate controlling portion 217 is a quantizer scale (mquant) value obtained from the normalized activity data norm_act. As a result, adaptive quantization is performed in consideration of visual characteristics.

Figure 8C:
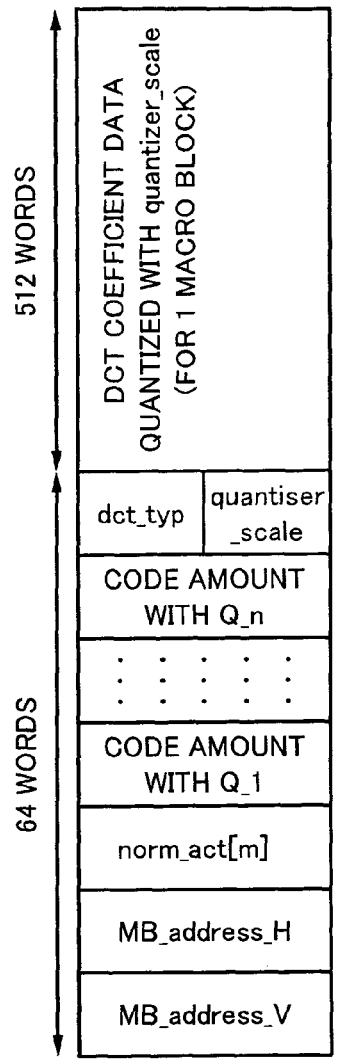

DCT coefficients quantized by the quantizing portion 218 are placed in the data portion of the stream as shown in FIG. 8C and then supplied to a VLC portion 219. The DCT coefficients quantized and supplied to the VLC portion 219 are for example zigzag scanned. With reference to a VLC table corresponding to two-dimensional Huffman code, the DCT coefficients are encoded with a variable length code.

Figure 9:
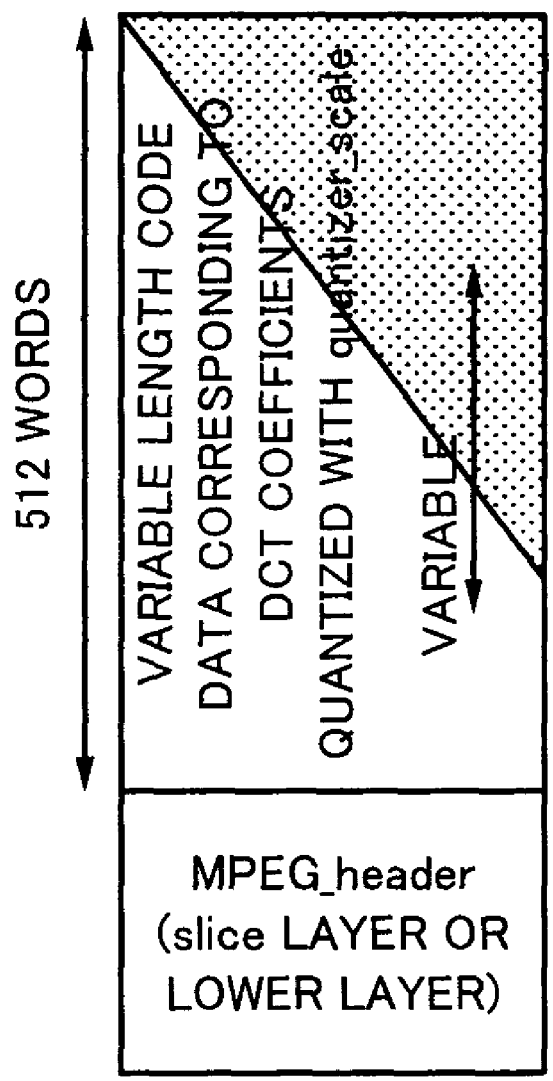
FIG. 9 is a schematic diagram showing an example of the structure of a stream transferred in each portion of the MPEG encoder.

At that point, an MPEG header portion which contains MPEG header information of the slice layer or lower layer as shown in FIG. 9 is substituted for the header portion which composes the first half portion of the stream in the VLC portion 219 and then the resultant stream is output. A variable length code is placed in the data portion on the second half side of the stream. In addition, the variable length code is bit-shifted so that it is byte-assigned and output as an MPEG ES.

Figure 10:
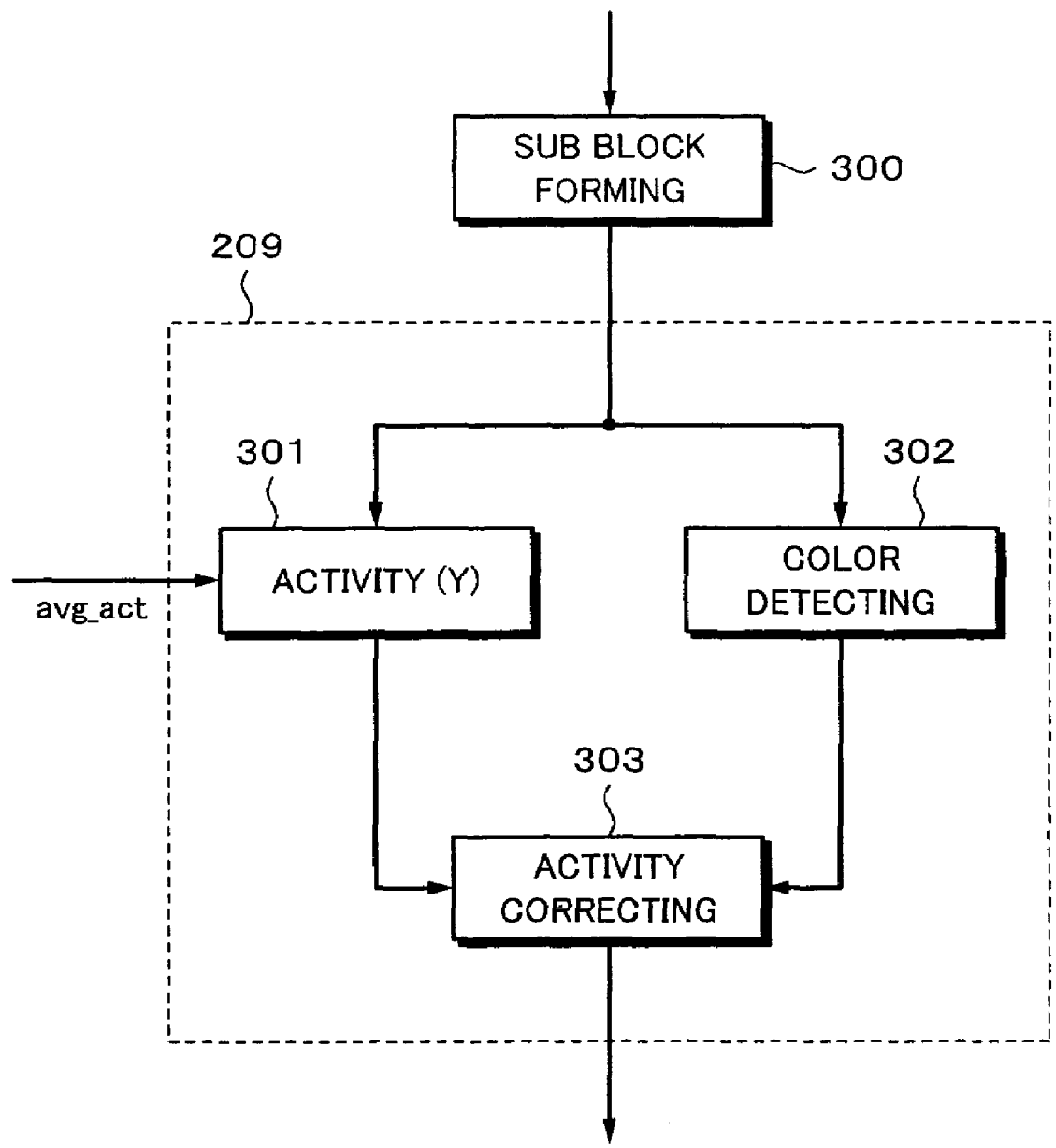
FIG. 10 is a block diagram showing an example of the structure of an activity portion.

FIG. 10 shows an example of the structure of the activity portion 209. Color difference components Cb and Cr of video data which is output from the DCT mode portion 208 are supplied to a sub block forming portion 300. According to the embodiment of the present invention, the sub block forming portion 300 divides a macro block of 16 pixels×16 lines into sub blocks of color difference data Cb and Cr each of which is composed of four pixels×four lines.

Figure 11C:
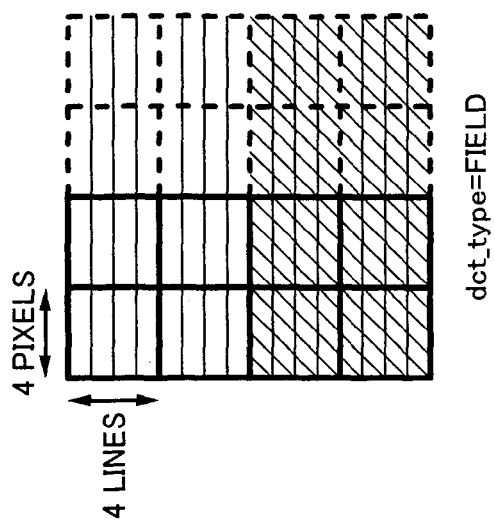
FIGS. 11A, 11B, and 11C are schematic diagrams for explaining a sub block forming method in an encoding mode.
Figure 11B:
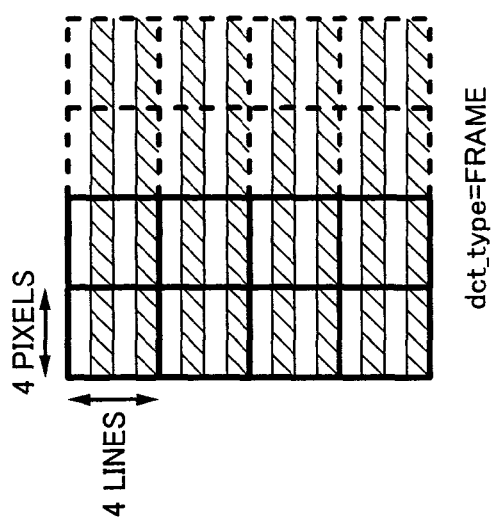
Figure 11A:
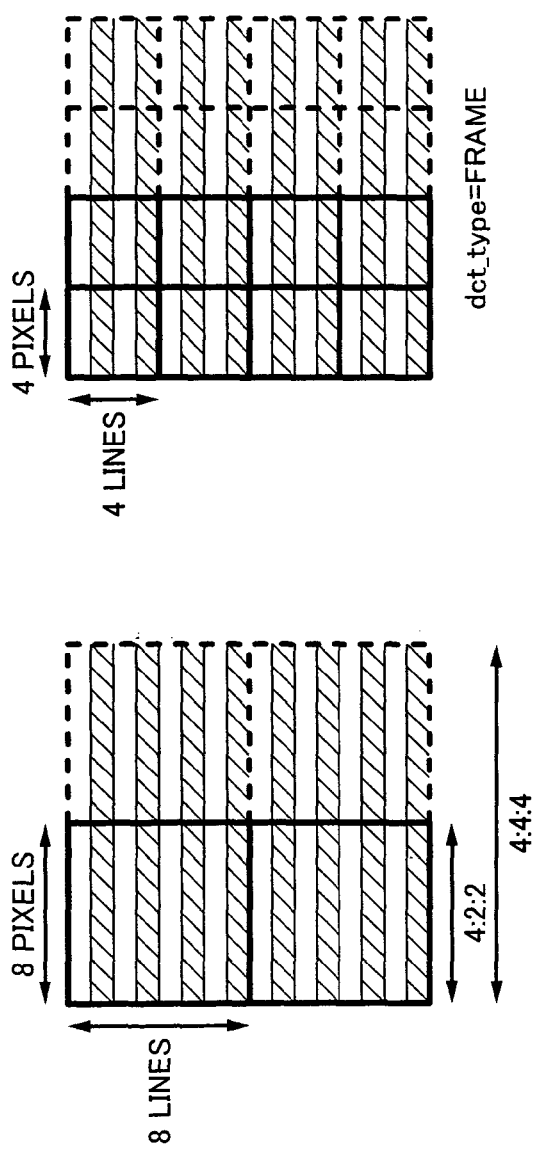

As one example, in the chroma format 4:2:2, as shown in FIG. 11A, a macro block contains color difference data Cb and Cr which are equal to two DCT blocks each of which is composed of eight pixels×eight lines. A total of eight sub blocks which are four sub blocks for color difference data Cr and four sub blocks for color difference data Cb are formed in one macro block. As another example, in the chroma format 4:4:4, a macro block contains color difference data Cb and Cr which are equal to four DCT blocks each of which is composed of eight pixels×eight lines. 16 sub blocks of color difference data are formed in one macro block. In other than the chroma formats 4:2:2 and 4:4:4, sub blocks can be formed in such a manner.

In FIGS. 11A, 11B, and 11C, fields to which lines belong are distinguished with a hatched area and a non-hatched area.

When the DCT mode type data dct_type embedded in the stream by the DCT mode portion 208 represents that the encoding mode is the frame DCT encoding mode, as shown in FIG. 11B, one sub block contains data of two fields which compose one frame. In contrast, when the encoding mode is the field encoding mode, as shown in FIG. 1C, one sub block is composed of data of the same field.

In the forgoing description, sub blocks are formed for only color difference components Cb and Cr of video data. Of course, sub blocks can be also formed for a luminance component Y of video data.

Data of the luminance component Y of video data which is output from the sub block forming portion 300 is supplied to an activity (Y) portion 301. Data of the color difference components Cb and Cr is supplied to a color detecting portion 302.

As was described above, the activity portion (Y) 301 obtains the normalized activity Nact for each macro block using the supplied luminance component Y of video data. The normalized activity Nact is supplied to an activity correcting portion 303. On the other hand, the color detecting portion 302 detects a predetermined color for each sub block corresponding to the supplied color difference data Cb and Cr of video data. The color detecting portion 302 determines whether or not the macro block contains the predetermined color corresponding to the detected result. The determined result is supplied to the activity correcting portion 303.

The activity correcting portion 303 corrects the normalized activity Nact supplied from the activity portion (Y) 301 corresponding to the determined result supplied from the color detecting portion 302. The corrected normalized activity Nact is embedded as normalized activity data norm_act in the stream. The processes of the color detecting portion 302 and the activity correcting portion 303 will be described in detail.

Figure 12:
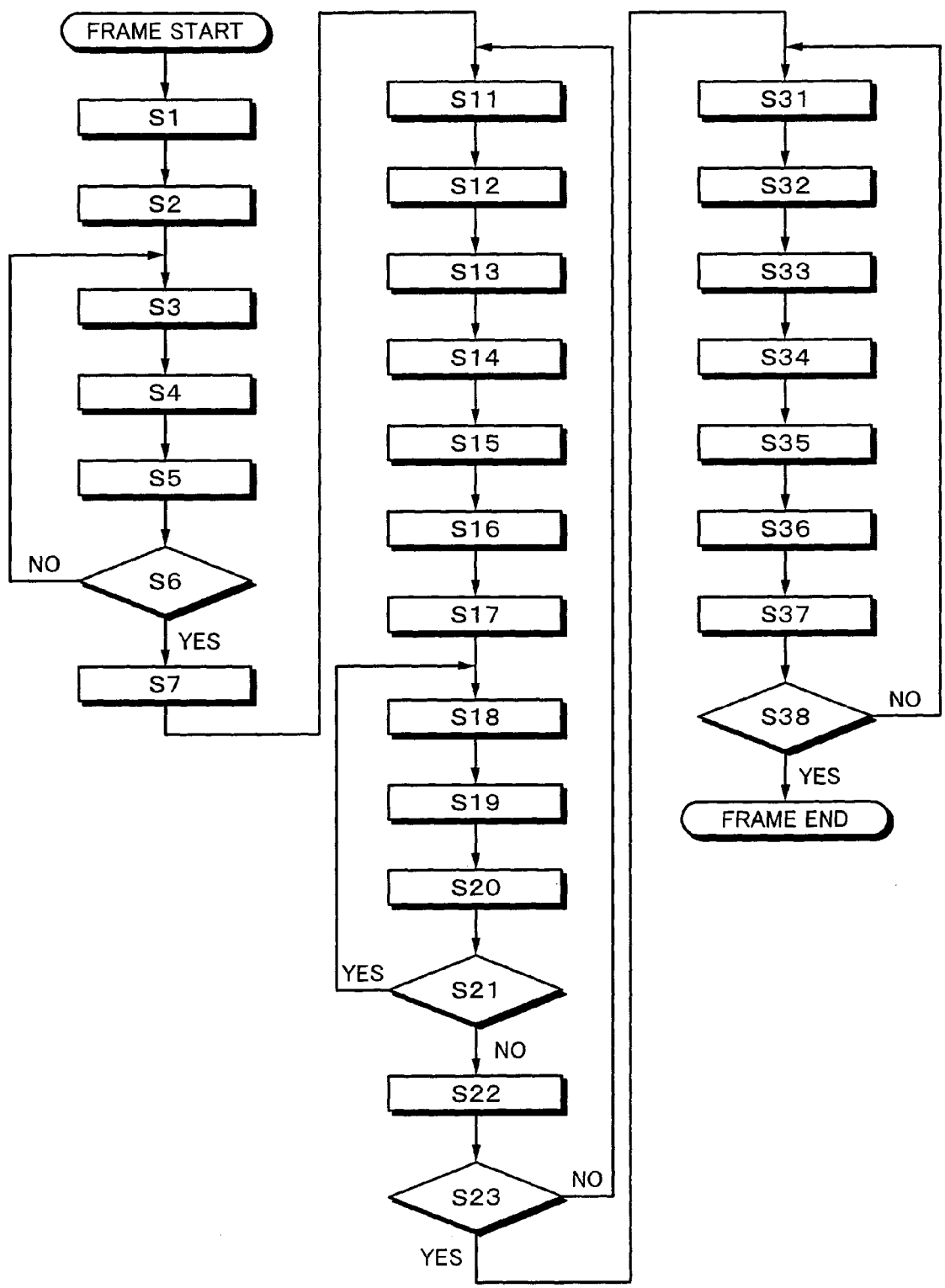
FIG. 12 is a flow chart showing a process of the MPEG encoder accomplished by software.

FIG. 12 is a flow chart showing an example of the case that the process of the MPEG encoder 103 is performed by software. Since the process shown in FIG. 12 is the same as the process of the hardware, the process of the software will be briefly described corresponding to the process of the hardware.

In the process shown in FIG. 12, steps S1 to S7 correspond to the process of the forgoing input field activity average processing portion 103A. Steps S11 to S21 correspond to the process of the forgoing pre-encode processing portion 103B. Steps S31 to S38 correspond to the process of the forgoing encode processing portion 103C.

At the first step S1, video data is captured through the input interface. At the next step S2, in the vertical blanking region, each header of the MPEG is created from the captured video data and stored in a memory. In other than vertical blanking region, the captured video data is stored in the memory.

At step S3, the scanning mode for the video data is converted from a raster scanning mode into a block scanning mode. A macro block is extracted from the video data. This operation is performed by controlling read addresses of the memory for the video data. At step S4, the activity of the first field of the macro block extracted from the video data is calculated. At step S5, the activity Activity (act) as the calculated result is cumulated. The cumulated result as a cumulated value sum is stored in the memory. A loop from step S3 to step S5 is repeated until it is determined that the last macro block of the first field has been processed at step S6. In other words, the cumulated value sum is the sum of activities of macro blocks for one field.

When the determined result at step S6 represents that up to the last macro block of one field has been processed, the flow advances to step S7. At step S7, the cumulated value sum stored in the memory is divided by the number of macro blocks of one field. As a result, the average value Activity (avg_act) of the field activities of which activities of one field are averaged is obtained. The obtained average value Activity (avg_act) is stored in the memory.

After the average value Activity (avg_act) of the field activities has been obtained, the flow advances to step S11. As with step S3, at step S11, the scanning mode of the video data stored in the memory is converted from the raster scanning mode into the block scanning mode. A macro block is extracted from the video data.

At step S12, the field DCT encoding mode or the frame DCT encoding mode is selected for the DCT process. The selected result is stored as DCT mode type data dct_typ to the memory. At step S13, the activity of a macro block for both the first and second fields is calculated. With the average value Activity (avg_act) of field activities, which was obtained at step s7 and stored in the memory, a normalized activity Activity (norm_act) is obtained. The obtained normalized activity Activity (norm_act) is stored in the memory.

At step S14, a color of the macro block is detected. For example, a predetermined color is detected corresponding to color difference data Cb and Cr of video data which is read for each sub block from memory. Corresponding to the detected result, it is determine whether or not the macro block contains the predetermined color. At step S15, corresponding to the determined result at step S14, the normalized activity Activity (norm_act) of the macro block containing the predetermined color is corrected. For example, the corrected normalized activity Activity (norm act) is overwritten on the normalized activity Activity (norm_act) on the memory.

At step S16, the macro block extracted from video data at step S11 is divided into DCT blocks each of which is composed of eight pixels×eight lines. The DCT blocks are processed by two-dimensional DCT. At step S17, DCT coefficients into which the DCT blocks have been converted by the two-dimensional DCT are quantized with a quantizer table (quantizer_table). Thereafter, the flow advances to step S18.

A cycle from steps S18 to S21 is repeated for each quantizer scale (quantizer_scale) value Qn. As a result, processes equivalent to the forgoing Q_n portions 212, 212, . . ., VLC portions 213, 213, cumulating portions Σ 214, 214, . . ., and cumulating portions Σ 215, 215, . . . are performed. In other words, at step S18, DCT coefficients are quantized with the quantizer scale value Q=1.

After the DCT coefficients have been quantized at step S18, the flow advances to step S19. At step S19, with reference to a VLC table, the quantized DCT coefficients are encoded with a variable length code. At step S20, the generated code amount of the macro block encoded with the variable length code is calculated. The calculated generated code amount is stored in the memory. At step S21, it is determined whether or not there is the next quantizer scale value Q. When the determined result at step S21 represents that there is the next quantizer scale value (YES), the flow returns to step S18. At step S18, the process is performed for the next quantizer scale value Q.

When the determined result at step S21 represents that the cumulated values of the generated code amounts of the macro block have been obtained for all the quantizer scale values Qn, the flow advances to step S22. At step S22, the generated code amounts of the macro block obtained at step S20 are cumulated for one frame. At that point, using a visual characteristic of the forgoing mquant, an adaptive quantization is performed. At step S23, it is determined whether or not up to the last macro block (MB) of one frame has been processed. When the determined result at step S23 represents that up to the last macro block has not been processed, the flow returns to step S11. In contrast, when up to the last macro block has been processed and the generated code amount for one frame has been estimated, the generated code amount for one frame in the adaptive quantization for each quantizer scale value Qn is stored in the memory. Thereafter, the flow advances to step S31. At step S31, a real encoding process is performed.

As with step S11, at step S31, the scanning mode for the video data stored in the memory is converted from the raster scanning mode into the block scanning mode. As a result, a macro block is extracted from the video data. At the next step S32, the DCT encoding mode is designated corresponding to the DCT mode type data dct_typ stored in the memory at step S12.

At step S33, the macro block which has been extracted from the video data at step S31 is divided into DCT blocks each of which is composed of eight pixels×eight lines. The two-dimensional DCT process is performed for the DCT blocks. At step S34, DCT coefficients into which the DCT blocks have been converted by the two-dimensional DCT process are quantized with a quantizer table (quantizer_table). Thereafter, the flow advances to step S35.

At step S35, corresponding to the generated code amount for one frame for each quantizer scale value Q estimated at steps S11 to S23, to control a code amount generated in the real encoding process, a quantizer scale value used at step S36 is designated for each macro block.

At the next step S36, using the quantizer scale value Q designated at step S35, the DCT coefficients quantized with the quantizer table at step S34 are quantized.

At step S37, the DCT coefficients quantized at step S36 are encoded with a variable length code with reference to a VLC table. At step S38, it is determined whether or not up to the last macro block of one frame has been processed. When the determined result at step S38 represents that up to the last macro block for one frame has not been processed (NO), the flow returns to step S31. At step S31, the quantizing process and the variable length code encoding process are performed for the next macro block. In contrast, when the determined result at step S38 represents that up to the last macro block for one frame has been processed, the encoding process for one frame has been completed.

In the forgoing example, the pre-encoding process of steps S11 to S23 and the encoding process of steps S31 to S38 are described as independent processes. However, the present invention is not limited to such an example. For instance, data obtained by estimating a generated code amount at steps S11 to S23 is stored in the memory. Data which is obtained in a real encoding process is selected from the data stored in the memory. As a result, the process of steps S31 to S38 can be contained as a loop in the process of steps S11 to S23.

Next, an activity correcting process corresponding to a detected color according to the embodiment of the present invention will be described. The activity correcting process is performed by the activity portion 209 shown in FIGS. 2A, 2B, and 2C or at steps S14 and S15 shown in FIG. 12.

When picture quality is optimized using adaptive quantization with an activity in a compressing and encoding process corresponding to the MPEG2, since the deterioration of a flat portion of the picture is visually prominent, the flat portion is finely quantized with a small quantizer step using a small quantizer scale value. In contrast, since the deterioration of a complicated portion in the picture is not prominent, the complicated portion is coarsely quantized with a large quantizer step using a large quantizer scale value. In this method, the picture quality can be effectively optimized in the range of a limited code amount.

However, in adaptive quantization with an activity, visual characteristics of human beings against colors of a picture have not been considered. For example, as visual characteristics of human beings against colors, the sensitivity of red is high. Thus, the deterioration of red can be easily detected. In addition, blue of a blue back used in a chroma-key is a color whose deterioration should be suppressed from a view point of a picture process.

Thus, according to the embodiment of the present invention, a color whose deterioration should be suppressed is detected. A macro block containing the color is more finely quantized with a smaller quantizer step. As a result, the deterioration of the picture quality is suppressed.

In reality, a color to be detected is set as a range on a color difference plane represented by color differences Cb and Cr. It is determined whether or not color difference signals Cb and Cr of pixels of each sub clock composed of four pixels× four lines are in the set range of the color difference plane (Cb, Cr). The number of pixels in the range is counted for each sub block. When the counted value exceeds a predetermined threshold value, it is determined that the color which had been set has been detected in the sub block. The predetermined threshold value is at least ½ or greater of the total number of pixels contained in each sub block, for example ⅔ or greater thereof. In this case, when 11 or greater of 16 pixels contained in each sub block composed of four pixels×four lines are counted, it is determined that a color which had been set has been detected.

When the determined result represents that a color which had been set has been detected in at least one of sub blocks contained in one macro block, it is determined that the macro block contains the color which has been set.

In other words, in the chroma format 4:2:2, when a color which had been set has been detected from at least one of eight sub blocks of one macro block, it is determined that the macro block contains the color which had been set. Likewise, in the chroma format 4:4:4, when a color which had been set has been detected from one of 16 sub blocks contained in one macro block, it is determined that the macro block contains the color which had been set. This applies for other chroma formats besides the chroma formats 4:2:2 and 4:4:4.

Figure 13:
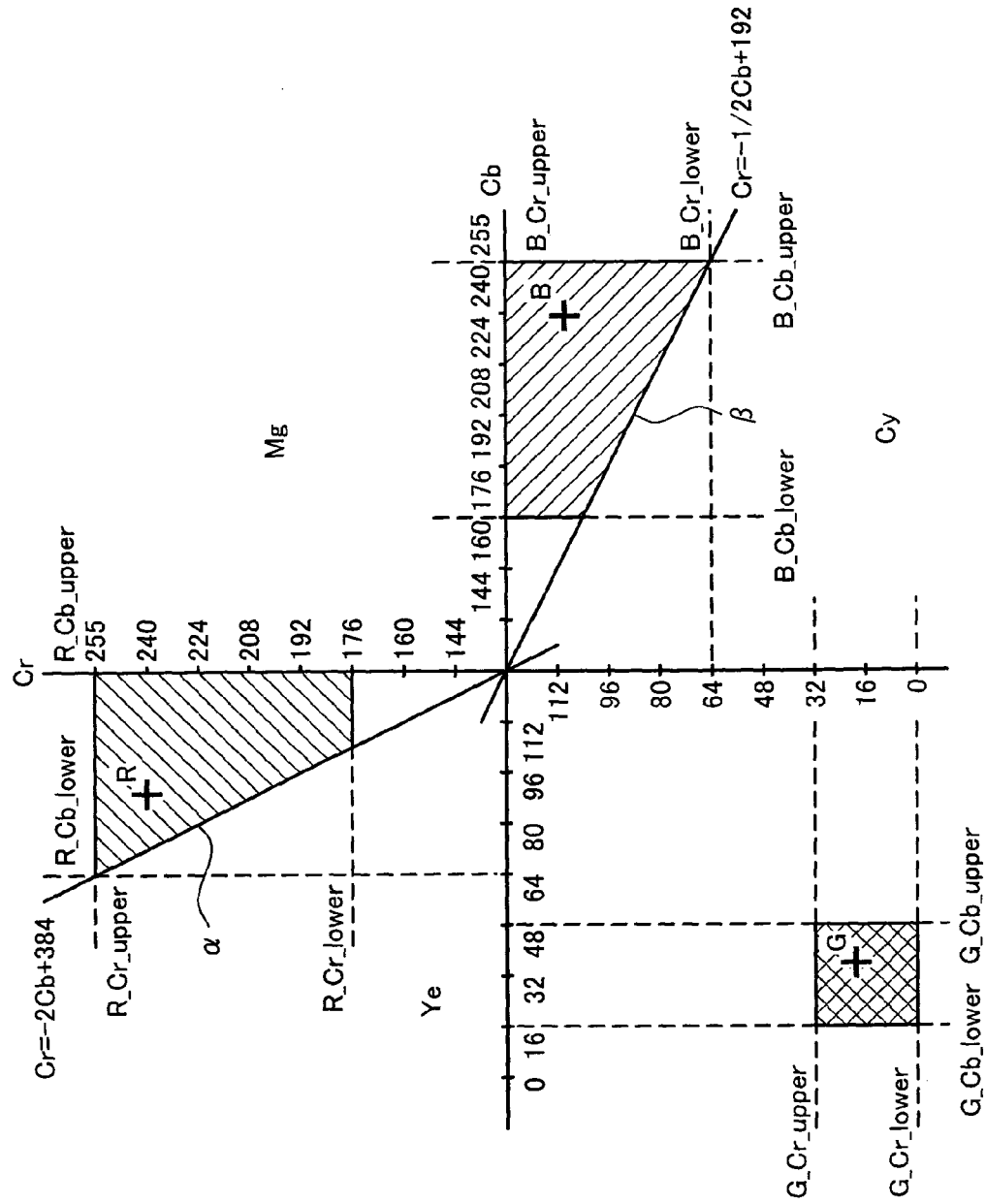
FIG. 13 is a graph showing a color difference plane (Cb, Cr) where color differences Cb and Cr are represented on a horizontal axis and a vertical axis.

Next, a method for setting a color to be detected will be described. FIG. 13 shows a color difference plane (Cb, Cr) of which color differences Cb and Cr are represented on a horizontal axis and a vertical axis, respectively. Any color is represented as one point on the color difference plane (Cb, Cr). For example, the positions of red (R), blue (B), and green (G) on the color difference plane (Cb, Cr) are denoted by "+(plus)" marks (point R, point B, point G). According to the embodiment, a color to be detected is set as a range on the color difference plane (Cb, Cr).

Red (R) as a color to be detected is set as a hatched range containing the point R. In other words, red is set as a range surrounded by a straight line á, Cb=128, Cr=255, and Cr=176 on the color difference plane (Cb, Cr). The straight line a is represented by the following formula (5).

$$Cr = -2Cb + 384 \quad (5)$$

Blue (B) as a color to be detected is set as a hatched range which contains the point B. In other words, blue is set as a range surrounded by a straight line a, Cr=128, Cb=176, and Cb=255 on the color difference plane (Cb, Cr). The straight line a is represented by the following formula (6).

$$Cr = (-\tfrac{1}{2})Cb + 192 \quad (6)$$

Green (G) as a color to be detected is set as a hatched range which contains the point G in FIG. 13. In other words, green is set as a range surrounded by Cr=32, Cr=0, Cb=48, and Cb=16 on the color difference plane (Cb, Cr).

It should be noted that the forgoing ranges are just examples. Thus, the present invention is not limited to such ranges. In other words, as long as a color similar to the tone of a color to be detected can be represented, the ranges can be set in another method. For example, in the forgoing example, the ranges of red and blue are set with the inclined straight lines á and â. Alternatively, the range(s) of red and/or blue can be set as a rectangle like the range of green. In the forgoing example, ranges are surrounded by straight lines. Alternatively, ranges can be surrounded by curved lines. In the forgoing example, colors to be detected are red, blue, and green. However, it should be noted that the present invention is not limited to such an example. In other words, any one or any two of red, blue, and green may be set as a color(s) to be detected. Alternatively, any color(s) other than red, blue, and green may be set as a color(s) to be detected.

In the ranges which have been set in such a manner, a color difference level Cb[p] of the color difference Cb and a color difference level Cr[p] of the color difference Cr are compared for each pixel contained in each sub block. It is determined whether or not the color of each pixel is in the range which has been set. The number of pixels determined as the color in the range is counted for each sub block. When the macro block contains at least one sub block of which the number of pixels determined as the color in the range exceeds a predetermined threshold value, it is determined that the macro block contains the color which has been set. A quantizer priority value for the color which has been set is selected for the macro block. By multiplying a normalized activity Nact by the quantizer priority value, the normalized activity Nact is corrected.

Assuming that colors to be detected are red (R), blue (B), and green (G), the detecting method for each color will be described in detail.

First of all, the detecting method for red (R) will be described with reference to the following programming list. The following list is described in C language, which has been used as a program describing language for computer apparatuses and so forth. Number+":" at the beginning of each line represents a line number with which each line is described.

```
 1:   R_det = 1.0;
 2:   for (n = 0; n < num_of_block; n++) {
 3:       R_cnt = 0;
 4:       for (p = 0; p < 16; p++) {
 5:           if ((Cr[p] >= -2*Cb[p] + 384) && (Cr[p] >= 176) && (Cb[p] <= 128)) {
 6:               R_cnt++;
 7:           }
 8:           if (R_cnt >= R_num) {
 9:               R_det = R_scale;
10:               break;
11:           }
12:   }
```

Line 1 represents that an initial value of a quantizer priority value R_det for red is set to [1.0]. Line 2 represents that a process performed in the following for each sub block is repeated for the number of sub blocks contained in one macro block. The number of sub blocks contained in one macro block is given by a value num_of_block. In the chroma format 4:2:2, the value num_of_block is [8]. In the chroma format 4:4:4, the value num_of_block is [16]. Line 3 represents that a count value R_cnt which represents the number of pixels determined as red is initialized.

Line 4 represents that processes of lines 5 and 6 are repeated for the number of pixels of the current sub block. Line 5 represents the range of red (hatched range containing the point R) shown in FIG. 13. In addition, line 5 determines whether or not a p-th pixel p of the current sub block is red. In other words, it is determined whether or not the color difference levels Cb[p] and Cr[p] of the pixel p satisfy the condition given on line 5. When they satisfy the condition, it is determined that the pixel p is red. On line 5, a symbol "&&" represents a logical product "AND." When the determined result represents that the pixel p is red, on line 6, the count value R_cnt is incremented by [1].

When the determination has been performed for 16 pixels of the current sub block, on line 8 the count value R_cnt is compared with a predetermined parameter R_num. The parameter R_num is a threshold value which represents the number of pixels in the total of pixels in the current sub block with which the current sub block is determined as red. At that point, a value of at least ½ or greater of the total number of pixels of the sub block is set as the parameter R_num so as to prevent random noise from being mistakenly detected and detect a group of red. According to the embodiment, [12], which is ¾ of the total number of pixels [16] of the sub block, is set as the parameter R_num.

When the determined result of the comparison of the count value R_cnt and the parameter R_num on line 8 represents that the count value R_cnt is equal to or greater than the parameter R_cnt, on line 9, a predetermined parameter R_scale is set as the quantizer priority value R_det for red. In this example, the parameter R_scale is [0.5].

Line 10 represents that "break" causes the flow to exit from the loop for which the number of repetitions has been set on line 2. In other words, when the count value R_cnt of at least one of sub blocks of one macro block is equal to or greater than the parameter R_num, the process for the macro block is finished. In addition, when the count value R_cnt of each sub block matches the parameter R_num, the flow exits from the loop. Thereafter, the quantizer priority value R_det for red of the macro block is set as the value of the parameter R_scale.

When the quantizer priority value R_det is applied for the macro block, the quantizer scale value of the macro block is changed to a small quantizer scale value which is a small quantizer step width corresponding to the quantizer priority value R_det. Thus, with the small quantizer step with, the macro block is more finely quantized. In other words, the normalized activity Nact is multiplied by the quantizer priority value R_det. The quantizer scale value is multiplied by the normalized activity Nact. With the resultant quantizer scale value mquant in consideration with the visual characteristics, the macro block is quantized. Thus, in the example, the quantizer scale value mquant is around half of that in the case that red is not detected. As a result, when the macro block is quantized, the generated code amount has priority. Thus, the macro block is more finely quantized.

The range of red on the color difference plane (Cb, Cr) may be given by a rectangle as expressed as line 5'.

```
5': if ((Cb[p]) >= R_Cb_lower) && (Cb[p] <= R_Cb_upper)
    && (Cr[p] >= R_Cr_lower) && (Cr[p] <= R_Cr_upper)
      In this example, the parameters R_Cb_lower,
R_Cb_upper, R_Cr_lower, and R_Cr_upper (see FIG. 13)
are given as follows:
    R_Cb_lower = 64
    R_Cb_upper = 128
    R_Cr_lower = 176
    R_Cr_upper = 255
```

Next, the detecting method for blue (B) will be described with reference to the following programming list. The following list is described in C language, which has been used as a program describing language for computer apparatuses and so forth. Number+":" at the beginning of each line represents a line number with which each line is described.

```
1:   B_det = 1.0;
2:   for (n = 0; n < num_of_block; n++) {
3:     B_cnt = 0;
4:     for (p = 0; p < 16; p++) {
5:       if ((Cr[p] >= (-½)*Cb[p] + 192) && (Cr[p]
<= 128) && (Cb[p] >= 176)) {
6:         B_cnt++;
7:       }
8:       if (B_cnt >= B_num) {
9:         B_det = B_scale;
10:        break;
11:      }
12:  }
```

Line 1 represents that an initial value of a quantizer priority value B_det for blue is set to [1.0]. Line 2 represents that a process performed in the following for each sub block is repeated for the number of sub blocks contained in one macro block. The number of sub blocks contained in one macro block is given by a value num_of_block. In the chroma format 4:2:2, the value num_of_block is [8]. In the chroma format 4:4:4, the value num_of_block is [16]. Line 3 represents that a count value B_cnt which represents the number of pixels determined as blue is initialized.

Line 4 represents that processes of lines 5 and 6 are repeated for the number of pixels of the current sub block. Line 5 represents the range of blue (hatched range containing the point B) shown in FIG. 13. In addition, line 5 determines whether or not a p-th pixel p of the current sub block is blue. In other words, it is determined whether or not the color difference levels Cb[p] and Cr[p] of the pixel p satisfy the condition given on line 5. When they satisfy the condition, it is determined that the pixel p is blue. When the determined result represents that the pixel p is blue, on line 6, the count value B_cnt is incremented by [1].

When the determination has been performed for 16 pixels of the current sub block, on line 8 the count value B_cnt is compared with a predetermined parameter B_num. The parameter B_num is a threshold value which represents the number of pixels in the total of pixels in the current sub block with which the current sub block is determined as blue. At that point, a value of at least ½ or greater of the total number of pixels of the sub block is set as the parameter B_num so as to prevent random noise from being mistakenly detected and detect a block of blue. According to the embodiment, [12], which is ¾ of the total number of pixels [16] of the sub block, is set as the parameter B_num.

When the determined result of the comparison of the count value B_cnt and the parameter B_num on line 8 represents that the count value B_cnt is equal to or greater than the parameter B_cnt, on line 9, a predetermined parameter B_scale is set as the quantizer priority value B_det for blue. In this example, the parameter B_scale is [0.75].

Line 10 represents that "break" causes the flow to exit from the loop for which the number of repetitions has been set on line 2. In other words, when the count value B_cnt of at least one of sub blocks of one macro block is equal to or greater than the parameter B_num, the process for the macro block is finished. Thereafter, the quantizer priority value B_det for blue of the macro block is set as the value of the parameter B_scale.

The quantizer priority value B_det is applied for the macro block in the same manner as the detecting method for red. Thus, in the example, the quantizer scale value mquant is around 0.75 of that in the case that blue is not detected. As a result, when the macro block is quantized, the generated code amount has priority. Thus, the macro block is more finely quantized.

The range of blue on the color difference plane (Cb, Cr) may be given by a rectangle as expressed as line 5'.

```
5': if ((Cb[p]) >= B_Cb_lower) && (Cb[p] <= B_Cb_upper)
   && (Cr[p] >= B_Cr_lower) && (Cr[p] <= B_Cr_upper)
   In this example, the parameters B_Cb_lower,
   B_Cb_upper, B_Cr_lower, and B_Cr_upper which represent
   ranges on the color difference plane (Cb, Cr) (see FIG.
   13) are given as follows:
   B_Cb_lower = 176
   B_Cb_upper = 255
   B_Cr_lower = 64
   B_Cr_upper = 128
```

Next, the detecting method for green (G) will be described with reference to the following programming list. The following list is described in C language, which has been used as a program describing language for computer apparatuses and so forth. Number+":" at the beginning of each line represents a line number with which each line is described.

```
1:   G_det = 1.0;
2:   for (n = 0; n < num_of_block; n++) {
3:       G_cnt = 0;
4:       for (p = 0; p < 16; p++) {
5:           if ((Cb[p]) >= G_Cb_lower) && (Cb[p] <=
             G_Cb_upper) && (Cr[p] >= G_Cr_lower) && (Cr[p] <=
             G_Cr_upper) {
6:               G_cnt++;
7:           }
8:           if (G_cnt >= G_num) {
9:               G_det = G_scale;
10:              break;
11:          }
12:  }
```

Line 1 represents that an initial value of a quantizer priority value G_det for green is set to [1.0]. Line 2 represents that a process performed in the following for each sub block is repeated for the number of sub blocks contained in one macro block. The number of sub blocks contained in one macro block is given by a value num_of_block. In the chroma format 4:2:2, the value num_of_block is [8]. In the chroma format 4:4:4, the value num_of_block is [16]. Line 3 represents that a count value G_cnt which represents the number of pixels determined as green is initialized.

Line 4 represents that processes of lines 5 and 6 are repeated for the number of pixels of the current sub block. Line 5 represents the range of green (hatched range containing the point G) shown in FIG. 13. In addition, line 5 determines whether or not a p-th pixel p of the current sub block is green. In other words, it is determined whether or not the color difference levels Cb[p] and Cr[p] of the pixel p satisfy the condition given on line 5. When they satisfy the condition, it is determined that the pixel p is green. When the determined result represents that the pixel p is green, on line 6, the count value G_cnt is incremented by [1].

In this example, the parameters G_Cb_lower, G_Cb_upper, G_Cr_lower, and G_Cr_upper which represent ranges on the color difference plane (Cb, Cr) (see FIG. 13) are given as follows:
G_Cb_lower=16
G_Cb upper=48
G_Cr_lower=0
G_Cr_upper=32

When the determination has been performed for 16 pixels of the current sub block, on line 8 the count value G_cnt is compared with a predetermined parameter G_num. The parameter G_num is a threshold value which represents the number of pixels in the total of pixels in the current sub block with which the current sub block is determined as green. At that point, a value of at least ½ or greater of the total number of pixels of the sub block is set as the parameter G_num so as to prevent random noise from being mistakenly detected and detect a block of green. According to the embodiment, [12], which is ¾ of the total number of pixels [16] of the sub block, is set as the parameter G_num.

When the determined result of the comparison of the count value G_cnt and the parameter G_num on line 8 represents that the count value G_cnt is equal to or greater than the parameter G_cnt, on line 9, a predetermined parameter G_scale is set as the quantizer priority value G_det for green. In this example, the parameter G_scale is [1]. In this case, although green is detected, the quantizer scale value mquant is not changed against the case that green is not detected. Thus, when the macro block is quantized, the generated code amount does not have priority.

Line 10 represents that "break" causes the flow to exit from the loop for which the number of repetitions has been set on line 2. In other words, when the count value G_cnt of at least one of sub blocks of one macro block is equal to or greater than the parameter G_num, the process for the macro block is finished. Thereafter, the quantizer priority value G_det for green of the macro block is set as the value of the parameter G_scale.

Next, a final quantizer priority value deciding method in the case that quantizer priority values of a plurality of colors have been detected from the same macro block will be described. When quantizer priority values R_det, B_det, and G_det of red, blue, and green are detected from the same macro block, the minimum value is selected from those quantizer priority values. The selected value is treated as the quantizer priority value for the macro block. This process can be expressed as follows in C language.

Color_scale=min(R_det, B_det, G_det)

In other words, a final quantizer priority value Color_scale of the macro block is decided by an operator min for selecting the minimum value from the quantizer priority values R_det, B_det, and G_det of these colors. With the decided quantizer priority value Color_scale, the activity portion (Y) 301 changes the normalized activity Nact obtained from the luminance component Y. As a result, the detected result of each color is reflected to a quantizer scale value. Assuming that the normalized activity Nact is normalized activity data norm_act, the correction of the normalized activity Nact with the quantizer priority value Color_scale can be represented as following in C language.

norm_act=Color_scale×norm_act

Figure 14:
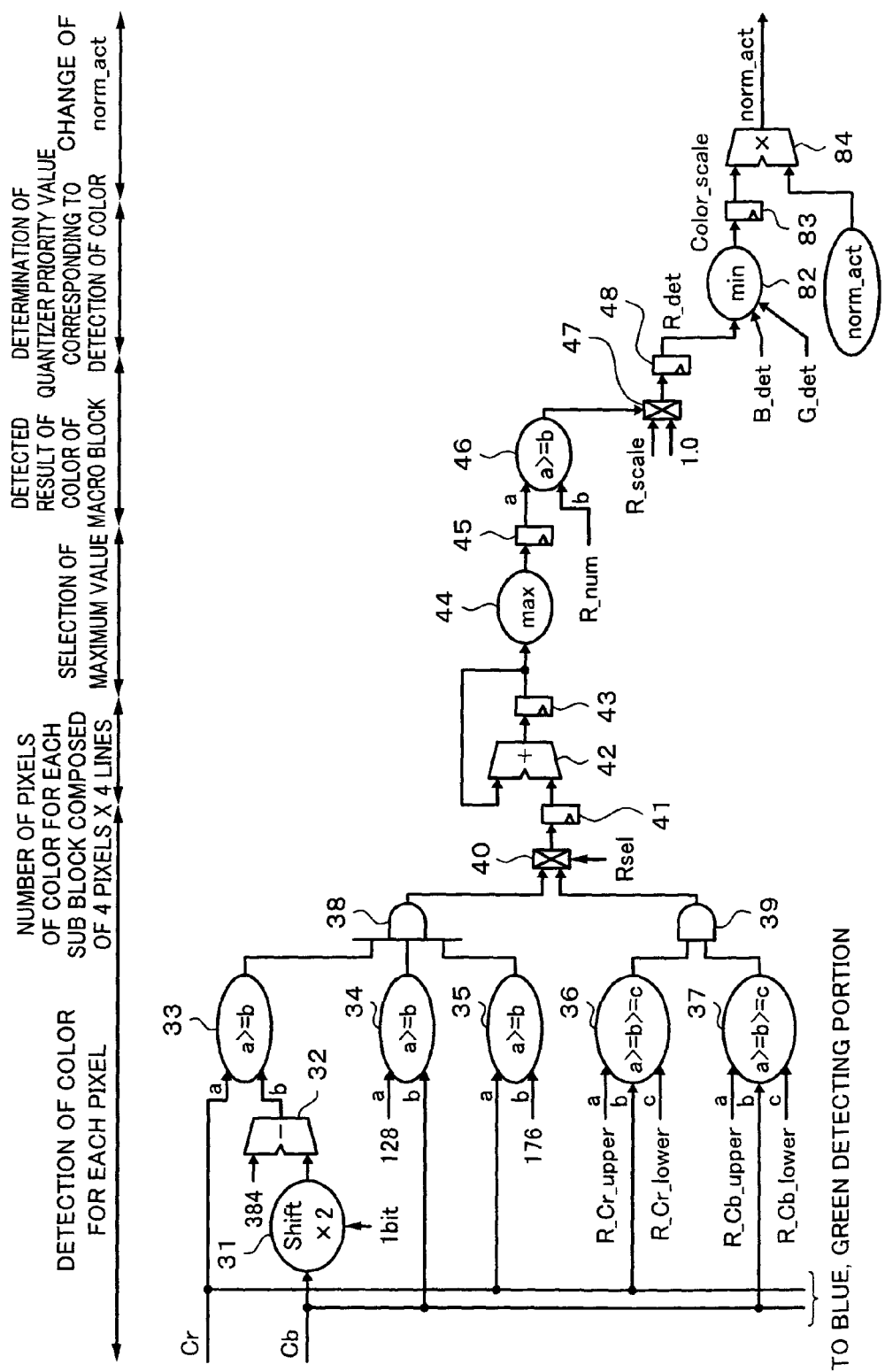
FIG. 14 is a block diagram showing an example of a hardware structure for executing a color detecting process.

FIG. 14 shows an example of a hardware structure for executing the forgoing color detecting process. The structure corresponds to the color detecting portion 302 and the activity correcting portion 303 shown in FIG. 10. The structure shown in FIG. 14 accomplishes the forgoing color detecting process and normalized activity Nact correcting process. The structure for detecting each of blue and green is almost the same as the structure for detecting red. Thus, for simplicity, FIG. 14 shows the structure for detecting red, omitting the structure for detecting blue and green.

Color difference data Cr of a pixel of a sub block is input to an input terminal a of a comparator 33, an input terminal a of a comparator 35, and an input terminal b of a comparator 36. Color difference data Cb of the same pixel is input to an input terminal b of a comparator 34, an input terminal b of a comparator 37, and a one-bit shift circuit 31.

The color difference data Cb which is input to the one-bit shift circuit 31 is shifted by one bit and thereby the value of the color difference data Cb is doubled. The resultant color difference data Cb is input to a first input terminal of a subtracting device 32. A value [384] is input to a second input terminal of the subtracting device 32. The subtracting device 32 subtracts an output of the one-bit shift circuit 31 from the value [384]. An output of the subtracting device 32 is input to an input terminal b of the comparator 33. The comparator 33 compares values which are input to the input terminals a and b. When the color difference data Cr is equal to or greater than the output of the subtracting device 32, the comparator 33 outputs a "H" level, for example a value [1]. The compared result of the comparator 33 is input to a first input terminal of an AND circuit 38.

A value [128] is input to an input terminal a of the comparator 34. The comparator 34 compares the value [128] and the color difference data Cb which is input to the input terminal b. When the color difference data Cb is equal to or smaller than the value [128], the comparator 34 outputs a "H" level. A value [176] is input to an input terminal b of the comparator 35. The comparator 35 compares the value [176] and the color difference data Cr which is input to the input terminal a. When the color difference data Cr is equal to or greater than the value [176], the comparator 35 outputs a "H" level. The compared results of the comparators 34 and 35 are input to second and third input terminals of the AND circuit 38, respectively.

The AND circuit 38 calculates a logical product of the compared results of the comparators 33, 34, and 35 which are input to the first, second, and third input terminals of the AND circuit 38. When all the inputs are a "H" level, the AND circuit 38 outputs a "H" level. In other words, the one-bit shift circuit 31, the subtracting device 32, and the comparator 33 determines the straight line a for the pixel. A logical product of the determined result and the compared results of the comparators 34 and 35 is calculated so as to determine whether or not the color of the pixel is in the hatched range containing the point R shown in FIG. 13. When the determined result represents that the color of the pixel is in the range, the AND circuit 38 outputs an "H" level.

Alternatively, in the circuit shown in FIG. 14, it is determined whether or not the color of the pixel is in a rectangle on the color difference plane (Cb, Cr). In this case, an upper limit value R_Cr_upper and a lower limit value R_Cr_lower of the color difference Cr for red are input to the input terminals a and c of the comparator 36. When the color difference data Cr is in the ranges of the upper limit value R_Cr_upper and the lower limit value R_Cr_lower, the comparator 36 outputs a "H" level. Likewise, an upper limit value R_Cb_upper and a lower limit value R_Cb_lower of the color difference Cb for red are input to the input terminals a and c of the comparator 37. When the color difference data Cb is in the ranges of the upper limit value R_Cb_upper and the lower limit value R_Cb_lower, the comparator 37 outputs a "H" level. The outputs of the comparators 36 and 37 are input to first and second input terminals of an AND circuit 39. The AND circuit 39 calculates a logical product of the outputs of the comparators 36 and 37. Corresponding to the result, it is determined whether or not the color of the pixel is in the ranges of the upper limit value R_Cr_upper and the lower limit value R_Cr_lower of the color difference Cr for red and in the ranges of the upper limit value R_Cb_upper and the lower limit value R_Cb_lower of the color difference Cb for red. When the color of the pixel is in the ranges, the AND circuit 39 outputs a "H" level.

The outputs of the AND circuit 38 and AND circuit 39 are input to a selector 40. The selector 40 selects one of the inputs corresponding to a selection signal Rsel. The selection signal Rsel is a signal supplied from the system controller 117 corresponding to user's setting or the like.

An output of the selector 40 is input to a register 41. A value which is read from the register 41 is input to a first input terminal of an adding device 42. An output of the adding device 42 is input to a register 43. A value which is read from the register 43 is input to a second input terminal of the adding device 42. In addition, a value stored in the register 43 is reset for each sub block. In other words, the adding device 42 and the register 43 cumulate the output of the selector 40 for each sub block and calculate a count value R_cnt for sub blocks.

The count value R_cnt which is read from the register 43 is supplied to a comparator 44. An output of the comparator 44 is input to a register 45. The comparator 44 compares the count value R_cnt of sub blocks stored in the register 45 and the count value R_cnt which is output from the register 43 and updates the register 45 with the larger value thereof. As a result, the maximum value of the count values R_cnt for red of sub blocks of one macro block is obtained. An output of the register 45 is input to an input terminal a of a comparator 46. The comparator 46 compares the output of the register 45 and a parameter R_num for a threshold value for the number of pixels detected as red. The parameter R_num has been input from an input terminal b of the comparator 46. The compared result of the comparator 46 is supplied as a selection signal to a selector 47.

A parameter R_scale for a quantizer priority value R_det is input to a first input terminal of the selector 47. A fixed value [1.0] is input to a second input terminal of the selector 47. The parameter R_scale is for example a value [0.5]. The selector 47 selects one of the first and second input terminals corresponding to the selection signal supplied from the comparator 46. In other words, when the count value R_cnt is equal to or greater than the parameter R_num, the comparator 46 selects the first input terminal and outputs the parameter R_scale. The parameter R_scale or fixed value [1.0] selected by the selector 47 is output as a quantizer priority value R_det for red. The quantizer priority value R_det is input to a first input terminal of a comparator 82 through a register 48.

On the other hand, blue and green are detected in the same manner as red. As a result, a quantizer priority value B_det for blue and a quantizer priority value for green are obtained. The quantizer priority value B_det for blue and the quantizer priority value G_det for green are input to a second input terminal and a third input terminal of the comparator 82.

According to the embodiment of the present invention, green is detected in a rectangular range on the color difference plane (Cb, Cr) shown in FIG. 13. Thus, the structure for the one-bit shift circuit 31, the subtracting device 32, the comparators 33, 34, and 35, the AND circuit 38, and the selector 40 shown in FIG. 14 is omitted.

The comparator 82 compares the quantizer priority values R_det, B_det, and G_det for red, blue, and green and outputs the minimum value of the quantizer priority values R_det, B_det, and G_det as a final quantizer priority value_Color_scale. The final quantizer priority value Color_scale is input to a first input terminal of a multiplying device 84 through a register 83.

Normalized activity data norm_act obtained from the luminance component Y of the macro block by the activity portion (Y) 301 is input to a second input terminal of the multiplying device 84. The multiplying device 84 multiplies the normalized activity data norm_act which is input to the second input terminal by the quantizer priority value Color_scale which is input to the first input terminal. Thus, the normalized activity data norm_act is corrected with the quantizer priority value Color_scale and the corrected normalized activity data norm_act is output.

When a plurality of colors red, blue, and green have been detected from a macro block, the minimum value of those quantizer priority values is selected as a final quantizer priority value Color_scale. With the selected quantizer priority value Color_scale, the original normalized activity norm_act is changed. As a result, the quantizer scale value is decreased. With the decreased quantizer scale value, the macro block is more finely quantized. In this state, data is compressed and encoded. When no color has been detected, the quantizer priority value for each color is set to a fixed value [1.0]. Thus, the normalized activity Nact is not changed. As a result, with the original normalized activity Nact, the macro block is quantized.

Next, a method for setting a threshold value for the number of pixels detected as a color will be described. When it is determined whether or not a predetermined color (for example, red) has been detected from each block by counting the number of pixels from which red has been detected for each block, the color may be incorrectly detected due to noise.

Figure 15B:
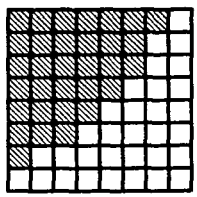
FIGS. 15A, 15B, 15C, and 15D are schematic diagrams for explaining the relation between the size of a sub block with which a color is detected and a threshold value of a count value of pixels with which a color is detected.
Figure 15A:
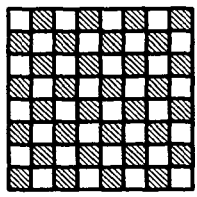

For example, it is assumed that a threshold value with which red is detected for each block composed of eight pixels×eight lines like each DCT block is ½ or greater than the total number of pixels of the block. FIGS. 15A and 15B show an example of which red has been detected from ½ of the total number of pixels of a block composed of eight pixels×eight lines. In FIGS. 15A and 15B, the count value R_cnt is [32], which is ½ of the total number of pixels [64] of the block. In FIGS. 15A, 15B, 15C, and 15D, shaded squares represent pixels detected as red.

When a block has 32 red pixels which are adjacent and successive as shown in FIG. 15B, they are recognized as a group of red by human eyes. In this case, red tends to be easily recognized and thereby the deterioration thereof tends to be visually detected. In contrast, when red pixels disperse in a block at random, human eyes hardly recognize them as red. In this case, the deterioration is not easily detected. Thus, in the case shown in FIG. 15A, it may be not necessary to decrease the quantizer priority value to a value smaller than [1], decrease the quantizer scale value, and finely quantize each block. In addition, as shown in FIG. 15A, when red pixels disperse at random, they may be affected by noise.

Figure 15C:
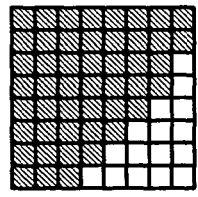

To detect a group of red, the threshold value for the count value of pixels detected as red is strictly set to for example ¾ or greater. FIG. 15C shows an example of which red is detected with a threshold value which is ¾ of the total number of pixels of a block. In the example shown in FIG. 15C, the count value R_cnt is [48], which is ¾ of the total number of pixels [64] of the block. When the threshold value is strictly set, red pixels do not disperse at random. As a result, a group of red pixels appears.

However, when the threshold value is increased, as shown in FIG. 15C, unless the area of a block of red is greater than that shown in FIG. 15B, red cannot be detected from a block.

When the compression rate is low, the code amount is relatively affordable. In this case, since the picture quality of the entire picture becomes high, the deterioration of the picture quality of a macro block which locally contains a predetermined color, for example a boundary portion of a predetermined color, becomes more prominent. Thus, when a red area in a block is as shown in FIG. 15B, it is necessary to correctly detect it, decrease the quantizer scale value for the block, and finely quantize the block so as to suppress the picture quality from being deteriorated.

On the other hand, if a block in which red pixels randomly disperse due to for example noise as shown in FIG. 15A is finely quantized with a decreased quantizer scale value, even if the block does not require high picture quality, it uses a code amount. Thus, since the code amount limited for each frame cannot be optimally used, the picture quality cannot be optimized.

Figure 15D:
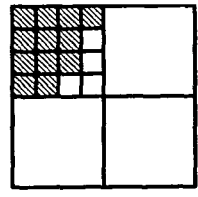

To solve such a problem, according to the embodiment of the present invention, the size of each block from which a color is detected is decreased. For example, each block is composed of four pixels×four lines. Like a block shown in FIG. 15C, FIG. 15D shows an example of which a color is detected with a threshold value which is ¾ of the total number of pixels of each block composed of four pixels×four lines. When the count value R_cnt of pixels detected as red is [12], which is the threshold value, the pixels detected as red do not randomly disperse. Instead, as shown in FIG. 15D, a group of red pixels appears. In addition, the area of a group of pixels detected as red does not visually become large as shown in FIG. 15C.

When at least one block from which a predetermined color has been detected is contained in a macro block which is quantized with the same quantizer scale value, it is determined that the macro block contains the predetermined color. Thus, according to the present invention, an activity of a macro block which locally contains a predetermined color (namely, a so-called edge portion, for example a contour portion of a character or a picture) can be suppressed. Thus, with a smaller quantizer step width, the macro block can be finely quantized. As a result, high picture quality can be accomplished.

Figure 16A:
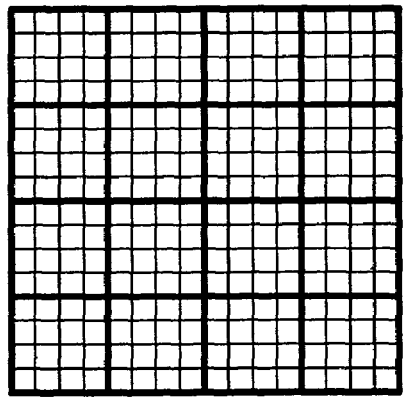
FIGS. 16A, 16B, and 16C are schematic diagrams for explaining a sub block forming method in a chroma format.
Figure 16B:
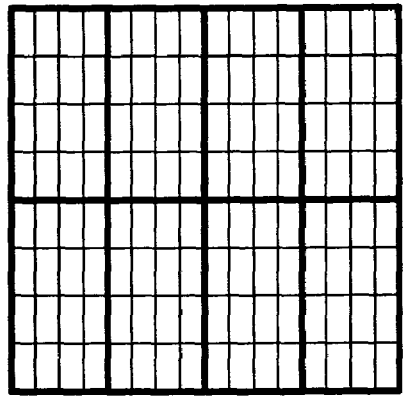
Figure 16C:
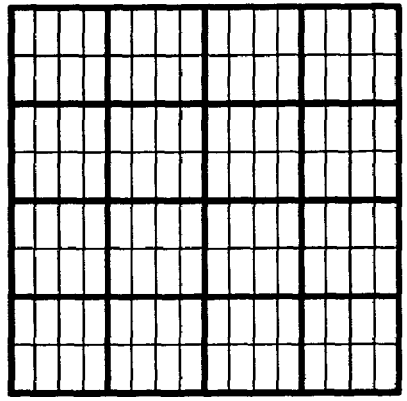

In the above description, it is assumed that in the chroma format 4:2:2, one macro block contains eight sub blocks each of which is composed of four pixels×four lines. In reality, as shown in FIG. 16B, in the chroma format 4:2:2, a sub block of four pixels×four lines is an oblong block. Thus, as shown in FIG. 16C, each sub block may be a square block composed of two pixels×four lines. As a result, each macro block may be processed as 16 sub blocks. In the chroma format 4:4:4, as shown in FIG. 16A, a sub block of four pixels×four lines is a square block. One macro block contains 16 sub blocks.

As was described above, the color detecting process and quantizer scale value changing process corresponding to a detected color corresponding to the embodiment of the present invention can be accomplished by any of hardware and software. A program which causes for example a computer apparatus to execute those processes is recorded on a CD-ROM (Compact DiscRead Only Memory) and provided therewith. When the CD-ROM is loaded to a CD-ROM drive of the computer apparatus and the programs recorded on the CD-ROM are installed to the computer apparatus, the processes can be executed on the computer apparatus. Since the structure of the computer apparatus is well known, the description thereof will be omitted.

In the forgoing example, as an embodiment, the present invention is applied for a digital VTR. However, the present invention is not limited to that. For example, the present invention can be applied for a quantizer calculating circuit which has a color detecting function and a quantizer scale value changing function corresponding to a detected color.

In addition, the sizes of the forgoing macro block and sub block are just examples. In other words, the present invention can be applied for any combination of other sizes of blocks.

In addition, in the forgoing description, the threshold value of the count value of pixels detected as each color in each sub block is the same. In addition, the size of each sub block is the same. However, the present invention is not limited to those. For example, a threshold value which differs in each color to be detected can be used. Likewise, each color can be detected for each sub block whose size differs in each color.

In addition, in the forgoing description, the threshold value of the number of sub blocks determined that a macro block contains a predetermined color is 1. The present invention is not limited to such an example. Instead, the threshold value may be 2 or greater. In other words, when a predetermined color has been detected from a plurality of sub blocks (for example, two sub blocks) of a macro block, it can be determined that the macro block contains the predetermined color.

As was described above, when an activity representing the complexity of each macro block of a picture is decided, a color component contained in each macro block is detected. When a predetermined color component has been detected from a macro block, the activity thereof is changed so that the macro block is more finely quantized. Thus, a picture can be compressed and encoded in consideration of visual characteristics of human beings against colors.

In addition, according to the present invention, a color component contained in a macro block is detected for each sub block which is smaller than each macro block and which is composed of for example four pixels×four lines. In addition, when a predetermined color has been detected from pixels which are equal to or greater than a threshold value of ⅔ or greater of the total number of pixels of the sub block, it is determined that the predetermined color is contained in all the macro block which contains the sub block.

Thus, a color can be detected from a macro block which locally contains a predetermined color (namely, a so-called edge portion such as a contour portion of a character or a picture).

Thus, the detection size can be optimized. In addition, only a group of color can be detected without an influence of noise.

The invention claimed is:

1. A picture processing apparatus, comprising:
   sub block forming means for dividing each of a plurality of main blocks that are the minimum process blocks of picture data into a plurality of sub blocks;
   color detecting means for detecting whether each of the plurality of main blocks represents a predetermined color by detecting whether at least one sub block contained by the corresponding main block represents a predetermined color,
   wherein the sub block's pixels that have a value being related with the predetermined color and being within a predetermined range are counted and when the count exceeds a predetermined value, the sub block is detected to represent the predetermined color;
   quantizing means for quantizing the picture data with a quantizer step width that is set for each main block; and
   quantizer step width changing means for setting a smaller quantizer step width of the quantizing means to a main block that represents the predetermined color than a main block which does not represent the predetermined color.

2. The picture processing apparatus as set forth in claim 1, further comprising:
   converting means for performing a predetermined conversion for each main block of the picture data before the picture data is quantized by the quantizing means.

3. The picture processing apparatus as set forth in claim 2, wherein the predetermined conversion is DCT.

4. The picture processing apparatus as set forth in claim 1, wherein when the determined result of the color detecting means represents that at least ½ of pixels of a sub block represent the predetermined color, the color detecting means determines that the sub block represents the predetermined color.

5. The picture processing apparatus as set forth in claim 1, wherein the quantizer step width changing means changes an activity based on a detected result of the color detecting means, the activity being a value corresponding to the complexity of each main block of a picture and being used to set a quantizer scale value, so as to set a smaller quantizer step width of the quantizer means to a main block which represents the predetermined color than a main block which does not represent the predetermined color.

6. A picture processing method, comprising the steps of:
   dividing each of a plurality of main blocks that are minimum process blocks of picture data into a plurality of sub blocks;
   detecting whether each of the plurality of main blocks represents a predetermined color by detecting whether at least one sub block contained by the corresponding main block represents a predetermined color,
   wherein the sub block's pixels that have a value being related with the predetermined color and being within a predetermined range are counted and when the count exceeds a predetermined value, the sub block is detected to represent the predetermined color;
   quantizing the picture data with a quantizer step width that is set for each main block; and
   setting a smaller quantizer step width at the quantizer step to a main block that represents the predetermined color than a main block which does not represent the predetermined color.

7. The picture processing method as set forth in claim 6, further comprising the step of:
   performing a predetermined conversion for each main block of the picture data before the picture data is quantized at the quantizing step.

8. The picture processing method as set forth in claim 7, wherein the predetermined conversion is DCT.

9. The picture processing method as set forth in claim 6, wherein when the determined result at the color detecting step represents that at least ½ of pixels of a sub block represent the predetermined color, the color detecting step is performed by determining that the sub block represents the predetermined color.

10. The picture processing method as set forth in claim 6, wherein the quantizer step width changing step is performed by changing an activity corresponding to a detected result at the color detecting step, the activity being a value corresponding to the complexity of each main block of a picture and being used to set a quantizer scale value, so as to set a smaller quantizer step width at the quantizer step to a main block which represents the predetermined color than a main block which does not represent the predetermined color.

11. A computer-readable medium storing a computer program for causing a computer apparatus to execute a picture processing method, comprising the steps of:
  dividing each of a plurality of main blocks that are the minimum process blocks of picture data into a plurality of sub blocks;
  detecting whether each of the plurality of main blocks represents a predetermined color by detecting whether at least one sub block contained by the corresponding main block represents a predetermined color,
  wherein the sub block's pixels that have a value being related with the predetermined color and being within a predetermined range are counted and when the count exceeds a predetermined value, the sub block is detected to represent the predetermined color;
  quantizing the picture data with a quantizer step width that is set for each main block; and
  setting a smaller quantizer step width at the quantizer step to a main block that represents the predetermined color than a main block which does not represent the predetermined color.

12. A picture processing apparatus, comprising:
  a sub block forming device configured to divide each of a plurality of main blocks that are the minimum process blocks of picture data into a plurality of sub blocks;
  a color detecting device configured to detect whether each of the plurality of main blocks represents a predetermined color by detecting whether at least one sub block contained by the corresponding main block represents a predetermined color,
  wherein the sub block's pixels that have a value being related with the predetermined color and being within a predetermined range are counted and when the count exceeds a predetermined value, the sub block is detected to represent the predetermined color;
  a quantizing device configured to quantize the picture data with a quantizer step width that is set for each main block; and
  a quantizer step width changing device configured to set a smaller quantizer step width of the quantizing device to a main block that represents the predetermined color than a main block which does not represent the predetermined color.

13. The picture processing apparatus of claim 12, wherein the sub block is 4 pixels by four lines.

14. The picture processing apparatus of claim 12, wherein the predetermined color is red color.

15. The picture processing apparatus of claim 12, wherein the main block is a DCT block.

16. The picture processing apparatus of claim 12, wherein the picture data is encoded to the MPEG standard.

17. The picture processing apparatus of claim 12, wherein the quantizer step width changing device determines a quantizer priority value for the main block.

18. The picture processing apparatus of claim 1, wherein the sub block is 4 pixels by four lines.

19. The picture processing apparatus of claim 1, wherein the predetermined color is red color.

20. The picture processing apparatus of claim 1, wherein the main block is a DCT block.

21. The picture processing apparatus of claim 1, wherein the picture data is encoded to the MPEG standard.

22. The picture processing apparatus of claim 1, wherein the quantizer step width changing means determines a quantizer priority value for the main block.

* * * * *